Dec. 13, 1966    R. H. SONNEBORN ETAL    3,291,672
METHOD OF FORMING A SYNTHETIC RESIN PANEL
Filed April 4, 1963    10 Sheets-Sheet 2

INVENTORS
RALPH H. SONNEBORN
FERNANDO ALVAREZ DE TOLEDO
BY & RONALD Z. BELL

ATTORNEYS

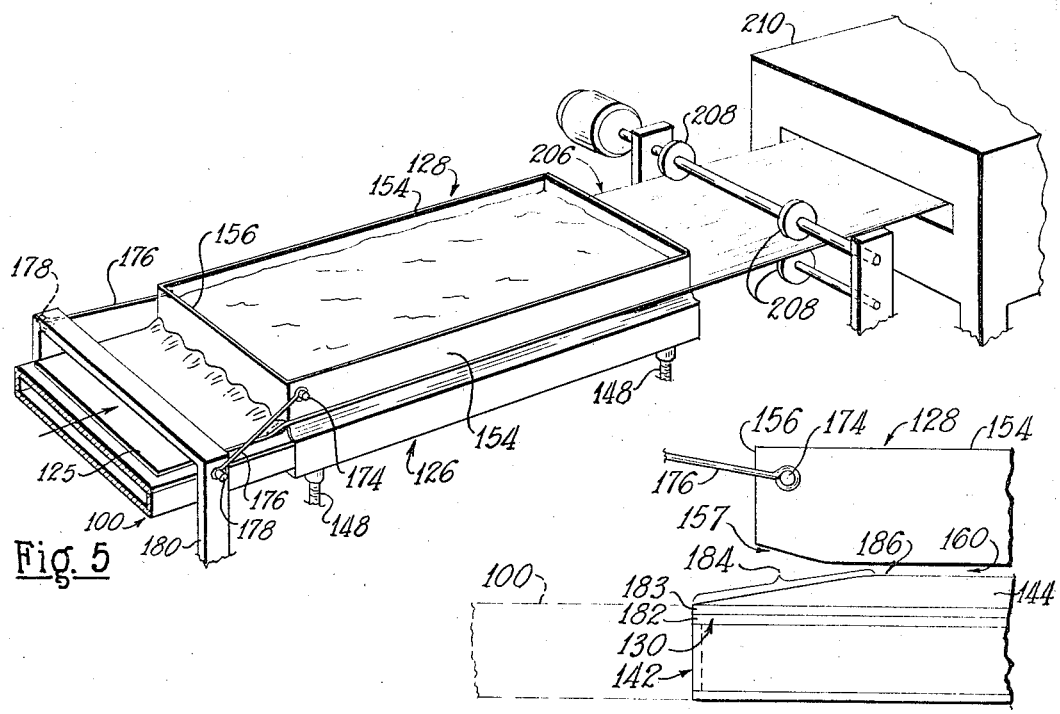
Fig. 5
Fig. 6
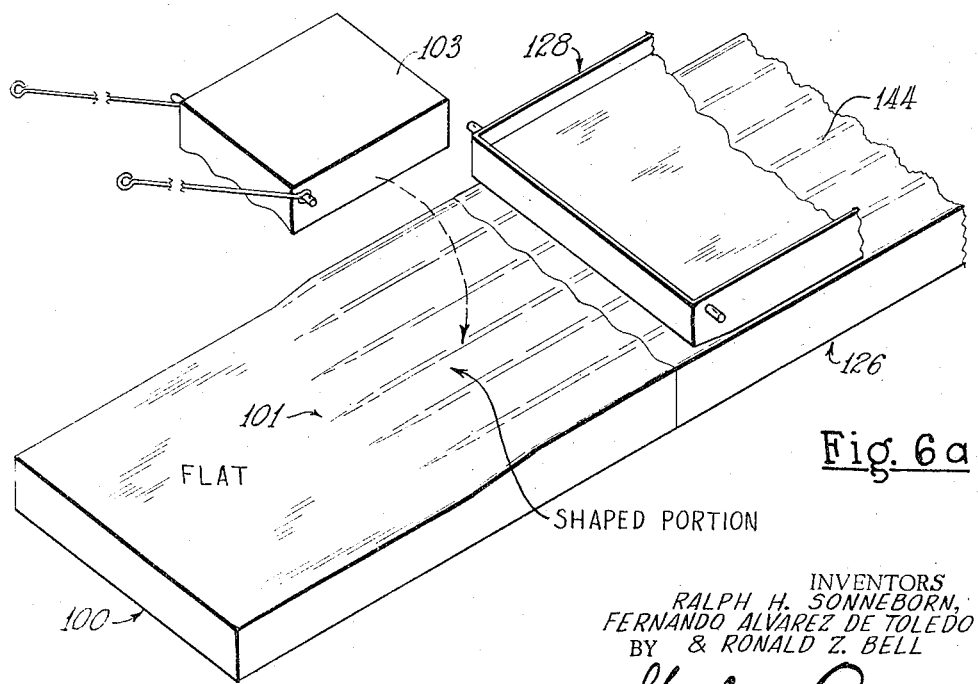
Fig. 6a

INVENTORS
RALPH H. SONNEBORN,
FERNANDO ALVAREZ DE TOLEDO
BY & RONALD Z. BELL

ATTORNEYS

Dec. 13, 1966    R. H. SONNEBORN ET AL    3,291,672
METHOD OF FORMING A SYNTHETIC RESIN PANEL
Filed April 4, 1963    10 Sheets-Sheet 5

INVENTORS
RALPH H. SONNEBORN,
FERNANDO ALVAREZ DE TOLEDO
BY & RONALD Z. BELL

ATTORNEYS

Dec. 13, 1966     R. H. SONNEBORN ETAL     3,291,672
METHOD OF FORMING A SYNTHETIC RESIN PANEL
Filed April 4, 1963     10 Sheets-Sheet 6

INVENTORS
RALPH H. SONNEBORN,
FERNANDO ALVAREZ DE TOLEDO
BY  & RONALD Z. BELL

ATTORNEYS

Dec. 13, 1966   R. H. SONNEBORN ETAL   3,291,672
METHOD OF FORMING A SYNTHETIC RESIN PANEL
Filed April 4, 1963   10 Sheets-Sheet 8

INVENTORS
RALPH H. SONNEBORN,
FERNANDO ALVAREZ DE TOLEDO
BY & RONALD Z. BELL

ATTORNEYS

United States Patent Office 3,291,672
Patented Dec. 13, 1966

3,291,672
METHOD OF FORMING A SYNTHETIC RESIN PANEL
Ralph H. Sonneborn, Fernando Alvarez de Toledo, and Ronald Z. Bell, Huntingdon, Pa., assignors to Owens-Corning Fiberglas Corporation, a corporation of Delaware
Filed Apr. 4, 1963, Ser. No. 270,727
7 Claims. (Cl. 156—289)

This invention relates to synthetic resin panels and methods and apparatus for production. More particularly this invention relates to reinforced synthetic resin panels characterized by improved durability, weather-resistance and esthetic appeal; to a continuous process for producing such improved synthetic resin panels; and to apparatus for producing such improved synthetic resin panels on a continuous basis.

THE PROBLEM

Prior panel

As is well known, panels made from synthetic resins have been used rather widely in the years since their introduction on a commercial scale following World War II. These panels have found rather extensive application for transparent closures such as windows and skylights; for interior decorative partitions and walls; and as exterior screen fences, and the like.

It is well known, as evidenced by the volume of production of these panels, that at least in their original condition they impart an esthetic appeal to building partitions and other applications. Having a color or dye incorporated into the resin component, they are characterized by built-in color that is theoretically everlastnig.

However, these prior products generally have been made with polyester resins, and exterior exposure has been devastating. Thus, under the effects of direct sunlight, rain and other weather conditions, etc., the prior panels have displayed extremely poor resistance to weathering. The weathering is characterized by rapid surface erosion of the resin causing fiber exposure and an extremely ugly appearance. Also, poor color stability has been evident from the decay in the vividness of color in a weathered panel as contrasted to a new unit. Thus, the prior products have exhibited extremely low resistance to ultra violet light. These characteristics faults of the prior products are very widely known.

Also, in prior art products, exposed fibers collect dirt and industrial fumes; ruin the appearance of the panel; and invite further weathering causing a larger drop in light transmission.

The foregoing changes, of course, take place over a period of from one to three years after installation. The result is a very unhappy customer when he realizes how much money and effort went into his original installation to provide such disappointing results.

The net result has been a bad reputation against the panel manufacturers. Further, the reputation of the glass fiber manufacturer has suffered because many people conclude that glass fiber reinforced plastic panels are "cheap" products.

It would, therefore, provide a substantial advance to the art if glass fiber reinforced synthetic resin panels could be produced that were of substantially improved durability against weathering; had good color stability and resistance to ultra violet light; had high gloss retention; and were characterized by high light transmission under all conditions of exposure including rain, sun, snow and others. It would also provide an advance to the art if such panels had good gloss retention by being resistant to surface erosion; were thus resistant to fiber prominence, and thus exhibited greater esthetic appeal.

Prior production

In the earlier days of reinforced polyester panels, hand lay-up batch operations were used. Curing was also by a batch operation, and this was effected for the most part in hot air ovens. In this operation, the wet resin lay-up was formed by laying down the various elements as follows:

(1) Bottom cover film of cellophane or acetate;
(2) Reinforcement mat of glass fibers;
(3) Addition of liquid resin to saturate the reinforcement mat; and
(4) Top cover film.

The lay-ups were then placed on caul sheets and cured to provide rigid panels.

Gradually various continuous processes evolved, using the polyester resins and glass reinforcement in about the steps set forth above. One such process utilizes heated molds with the lay-up therebetween for shape formation. Due to the relatively mild exotherm of polyester resins, satisfactory production was effected; however, the products displayed low durability and extremly poor weathering. Also, this and most of the other processes have been characterized by resin runs in the panels, fiber washing, mold binding, air inclusion in the resin and others.

Thus a number of problems have beset those who have attempted to produce panels on a continuous basis even with polyesters. To our knowledge, here has been no commercially satisfactory process for molding and/or curing panels having high durability, as from acrylic resins.

Accordingly, another substantial advance in the art would be provided by a novel continuous method for producing panels of acrylic resin.

In this regard, a further substantial advance in the art would be provided by novel apparatus capable of continuously forming and then curing acrylic resin panels.

Other objects of this invention will appear in the following description and appended claims, reference being had to the accompanying drawings forming a part of this specification wherein like reference characters designate corresponding parts in the several views.

THE DRAWINGS

FIGURE 1a is a schematic representation of the process of invention;

FIGURE 5 is an isometric view illustrating the manner in which the top forming mold is held in fixed position on top of the moving laminate;

FIGURE 6 is a fragmentary side elevation of the contoured entrance mouth of the molds;

FIGURE 6a is a fragmentary perspective view showing shape development;

Figure 1:
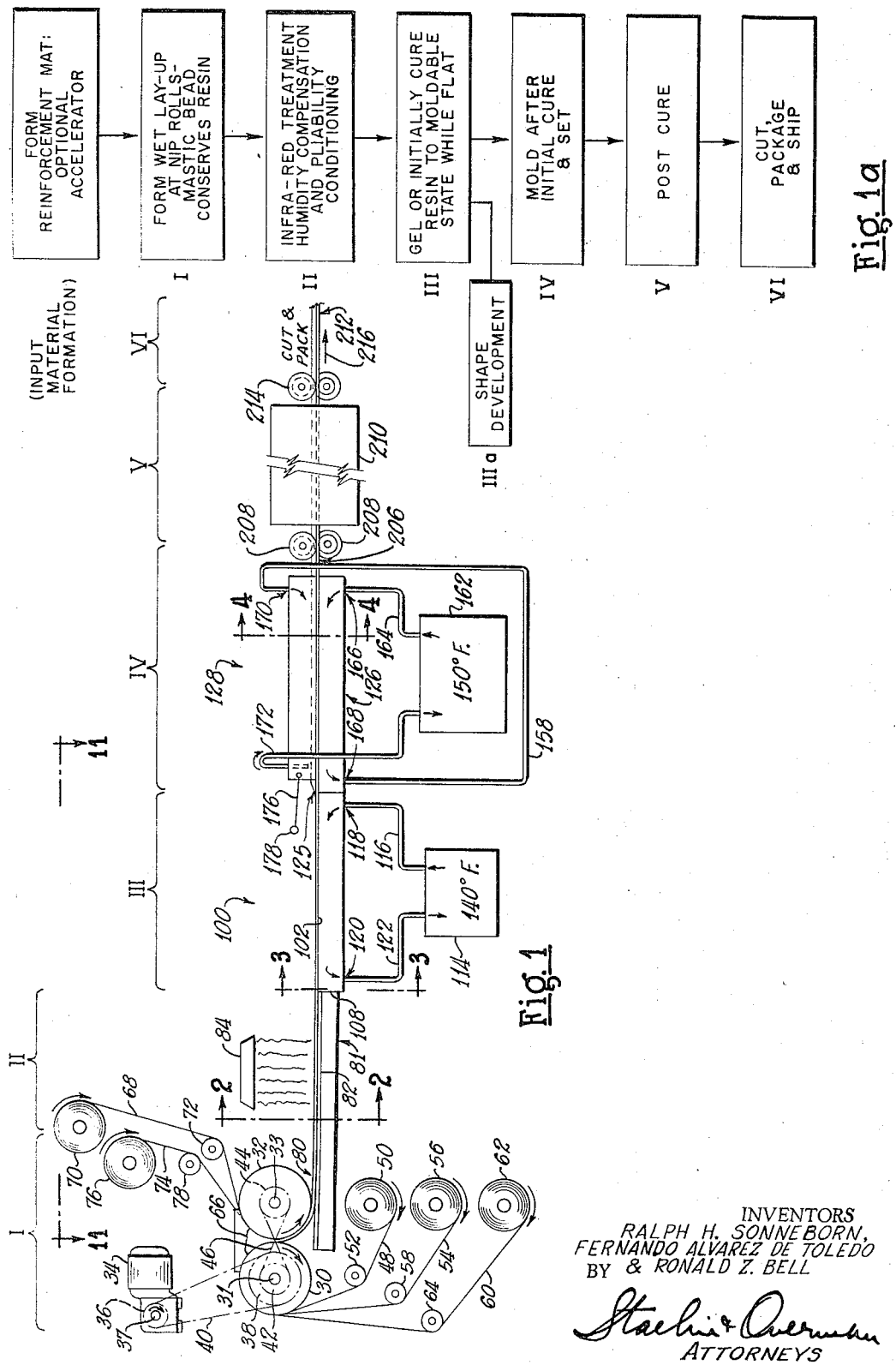
FIGURE 1 is a general and partially schematic side elevational view of the important portion of apparatus of the present invention capable of forming and curing synthetic resin panels on a continuous basis.

It is to be understood that the invention is not limited in its application to the specific details of construction and arrangement of parts illustrated in the drawings, since the invention is capable of other embodiments and of being practiced in various ways. Also, it is to be understood that the terminology employed is for the purpose of description and not of limitation.

GENERAL INTRODUCTION

The present invention is of three-fold aspect as follows:

(1) Novel synthetic resin panels reinforced with glass fibers and characterized by a specific resin formulation and catalyst system, manipulated in specified manner for molding and curing; and the panels being characterized by greater weather resistance, color stability and esthetic appeal than analogous prior art products;

(2) The method of producing synthetic resin panels including:

(a) specific continuous formation; and (b) continuous molding and curing; and (3) A production line capable of producing the improved panels of paragraph 1 on a continuous basis, with modifications including complete integration from fiber formation through mat development and on through finished resin panels.

In view of the foregoing, several novel aspects will be evident as the description develops, including the following:

(a) Acrylic resin systems utilized in a continuous process. These resin systems are characterized by the development of a relatively high exotherm of polymerization which is capable of boiling the monomer components if not carefully controlled. Further, these resin systems have a substantial affinity for air which therefore must be excluded at least from certain critical phases of the operation.

Therefore, the present invention provides novel method and apparatus for handling these aspects of these resin systems. Although, within the broader scope of invention, the novel features developed here are understood to be applicable to other thermosetting resin systems.

(b) In the invention, unique mastic applicators are utilized to place a mastic bead along the edges of the wet lay-up. This serves a number of important functions including excluding air from the lay-up. Some resin systems dissolve air and do not release it during the exotherm of curing. Acrylics however appear to "absorb" air and then during the curing exotherm the air is driven out, causing blisters and snow defects which result in reject panels. This absorption appears to be a function of temperature, and from room temperature to about 100° F. is quite high. Reversal at exotherm is disastrous to production, and the air must therefore be excluded. This is unique with respect to acrylic resin systems, and accordingly handling this criticality in accordance with the invention provides novelty. This is effected through the sealing action of the mastic at the edge of the lay-up at the time of formation of the lay-up at the nip. The mastic then functions to prevent air entry during the remainder of the processing.

(c) A related problem regarding air inclusion in the laminate extends from the necessity of a uniform glass-resin ratio. Even though air be excluded from the laminate, if resin rich areas are developed along the edges between the mat and the mastic bead, a boiled panel may result. This is due to the fact that the exotherm of pure resin is more pronounced than the exotherm of the resin-fiber composite. During curing, the pure resin exotherm being higher is directed into the edges of the laminate and causes a slight boiling along the edges. Accordingly, because the mastic substantially eliminates resin rich areas at the edges, this exotherm of pure resin is prevented. Accordingly, the mastic provides a multifold aspect of:

(1) excluding air;

(2) reducing resin rich areas along the edge of the laminate;

(3) maintains edge thickness control; and (4) provides more efficient resin utilization.

(d) Also, the manner of shaping the panel after initial cure or gel in the flat will become apparent.

In view of the foregoing synopsis, a complete description of all features of the invention will now be set forth.

THE RESIN SYSTEM AND CONTINUOUS PRODUCTION OF PANELS THEREFROM

An advantageous resin and catalyst system that has been developed for use in the continuous process of invention utilizes a unique combination of peroxides, including:

(a) lauroyl peroxide
(b) methyl ethyl ketone peroxide
(c) tert-butyl peroxypivalate
(e) tert-butyl peracetate Thus, the complete resin and catalyst system includes the following ingredients in the proportions indicated:

Acrylic resin syrup (du Pont Lucite
  #205) _____parts__ 100
Methyl methacrylate monomer _____do____ 10
Lauroyl peroxide _____percent__ 0.8
Methyl ethyl ketone peroxide _____do____ 0.16
Tert-butyl peroxypivalate _____do____ 0.72

In addition to the foregoing, it is also to be included within the scope of the invention to use either straight tert-butyl peroxypivalate or accelerator modified tert-butyl peroxypivalate as the catalyst. Thus, the following system would be included:

Acrylic syrup (du Pont Lucite #205) __ parts__ 100
Methyl methacrylate monomer _____do____ 12
Tert-butyl peroxypivalate _____percent__ 0.5–1.5

Still further, the following system is to be included within the scope of invention:

Acrylic syrup (du Pont Lucite
  #205) _____ parts__   100
Methyl methacrylate monomer _____ do____   12
Tert-butyl peroxypivalate _____ percent__  0.5–1.5
Accelerator 6 (du Pont product: organic and
  inorganic chlorides in methanol and higher
  boiling alcohols) _____ $1.25 \times 10^{-4}$ The foregoing resin formulations are combined with glass fiber reinforcement mats in a novel and continuous manner in accordance with the present invention and, simultaneously, with and following the continuous formation, are cured and molded on a continuous basis to produce the novel panels alluded to above.

CONTINUOUS PANEL FORMATION AND CURE

By reference to FIGURE 1 of the drawings, a side elevation will be observed of apparatus for the formation and curing of the novel synthetic panels of invention, both formation and cure being on a continuous basis.

THE VERTICAL NIP ROLLS

The actual formation of the wet laminate or lay-up takes place at the left or entrance end of the machine, at the vertical nip rolls. These are designated by reference numerals 30 and 32 and are understood to be cylindrical steel rollers supported on suitable anti-friction bearings at the ends. The bearings, of course, are mounted upon suitable support structures, not shown to avoid complicating the drawing.

It will be understood that the nip rolls 30 and 32 are optionally powered for simultaneous rotation in a common direction at the nip as indicated by the arrows. Driving power is derived from a gear reduction motor 34 having a sprocket 36 on its output shaft 37. Sprocket 36 is aligned with a larger drive sprocket 38 connected to the shaft 31 or roll 30. A chain 40 laps sprockets 36, 38 for driving roll 30 from the motor 34. Adjacent to sprocket 38 is a smaller sprocket 42. This is also carried on shaft 31 of roll 30 and is the same size as a corresponding sprocket 44 on shaft 33 of roll 32. Sprockets 42 and 44 are cross chained with a chain 46. Thus, when motor 34 turns in the arrow direction, the roll 30 is driven in the same direction, that is, toward the nip, and roll 32 is also driven toward the nip through the cross chain 46.

Another arrangement would be to gear the rolls together with a No. 5 pitch gear and drive one of them.

THE PANEL COMPONENTS

The basic component of the panels of this invention includes an acrylic resin system, optional reinforcement and/or filler materials can be included depending on whether structural or non-structural, decorative applications are contemplated.

A typical reinforced panel would include the following:
Top: surfacing mat;
Center: reinforcement mat(s); and
Bottom: surfacing mat.

These, of course, are impregnated and coated with resin that is cured into the finished product. During formation, these materials and the liquid resin are retained between top and bottom cover sheets such as cellophane or acetate, thus making a total of at least five layers in the lay-up during processing.

By reference to the left side of FIGURE 1, note that the bottom cover film is designated 48 and is fed from a stock roll 50 over a guide roll 52 into tangential contact with nip roll 30. The bottom surfacing mat is designated 54 and is fed from the stock roll 56 beneath guide roll 58 and then into tangential contact with nip roll 30 to overlie the bottom cover film 48. Next, the reinforcement mat 60 is fed from a stock roll 62 and around guide roll 64 and into tangential contact with nip roll 30 on top of bottom surface mat 54.

From the foregoing, it will be noted that the reinforcement mat 60 moves in a tangential infeed into a resin bath 66 maintained between the nip rolls 30, 32. The reason for this particular method of feeding and the advantages and inventive novelty resulting therefrom will be brought out in detail later.

In should be pointed out that the cover films in as-received condition in the roll are not sufficiently smooth for processing through the system. Therefore, lateral tension is applied to the films, not to stress or stretch them, but instead to tension them to a flat condition.

It should also be pointed out that tension may be applied to the cover films to draw them through the nip. However, the mats are carried into the nip in unstressed condition upon or by the cover films. Thus, forward motion without frictional drag or distortion of any kind is provided to advance the mats through the nip.

The top components of the wet resin lay-up include the top cover film 68 fed from a stock roll 70 beneath guide roll 72 and into top tangential contact with nip roll 32. Top surfacing mat 74 is fed from the stock roll 76 beneath guide roll 78 and into top tangential contact with nip roll 32 overlying top cover film 68. Note that there is also tangential entry of these top feed components into the resin bath 66, similar to the bottom feed components.

As the various mats 54, 60, 74 pass through the nip, they are impregnated with the liquid resin and are entrained between the bottom cover film 48 and top cover film 68 to form a wet lay-up 80.

THE INSULATED RUN OUT TABLE—HUMIDITY COMPENSATION SECTION

From FIGURE 1, it will be noted that the wet lay-up 80 proceeds downwardly from the forming nip and to the right, and is supported by a table 81 having a flat top 82. This table 81 in the embodiment of the invention shown has the top made of fiber board material having a low heat transfer coefficient. Although it is within the scope of the invention to have the table top in the form of a heated plate structure, the present arrangement provides a more economical set-up by utilizing a radiant heat source on only one side with loss of heat retarded from the table side.

Thus, an infra red radiant heater 84 is positioned above table top 82 and is directed to radiate downwardly on the wet lay-up 80. As will be brought out more fully hereinafter, this pre-heat section is used for the purpose of providing moisture control compensation to the cover films 48, 68 in accordance with existing ambient atmospheric humidity conditions. Thus, heater 84 is effective to reduce moisture content of the cellophane top and bottom cover films 48, 68 to a low level, so that exact tensions can be provided for retaining the lay-up in a flat, controllable condition for the subsequent steps of the operation.

Regarding this section, it is to be understood that the infrared rays from heater 84 penetrate the top cover film 68 and other components of the lay-up including bottom cover film 48 to gently warm the entire mass.

Since the resin system contains catalyst, the effect of the heat is to help initiate the exothermic polymerization reaction that the resin goes through during the polymerization reaction.

Figure 2:
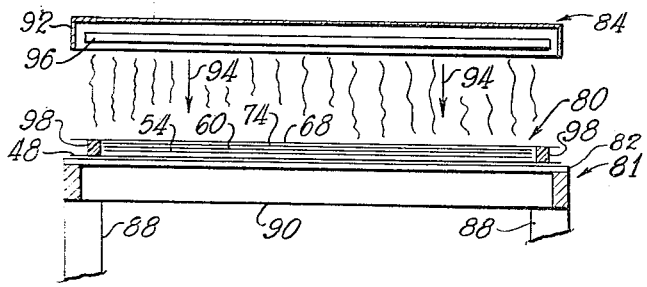
FIGURE 2 is an enlarged section taken along line 2—2 of FIGURE 1.

FIGURE 2 is provided to better illustrate the physical reaction which is imparted to the cover films in the humidity compensation section. Thus, the run out table 81 is provided with a fiber board top 82, supported on suitable legs 88, and cross stringers 90.

In FIGURE 2, it will be noted that the infrared heater 84 includes a reflecting housing 92 having an open bottom for downward radiation along the arrow line 94. Within the housing 92 there is provided a radiating element 96, actuated by suitable power such as electricity to produce a controlled level of infrared radiation.

Also in FIGURE 2, it will be noted that the wet lay-up 80 includes the bottom cover film 48, bottom surfacing mat 54, central reinforcing mat 60, top surface mat 74 and top cover film 68. Along the edges there are ribbons of mastic 98 to retain the resin closely adjacent to the edge limits of the reinforcement mat which are substantially the edge limits of the finished panel.

The rays from heater 84 precondition wet lay-up 80, aiding resin wet out of the reinforcement and surface mats, and in general prepare the wet lay-up for the next stage of operation.

THE GEL PLATE—GEL SECTION

Figure 3:
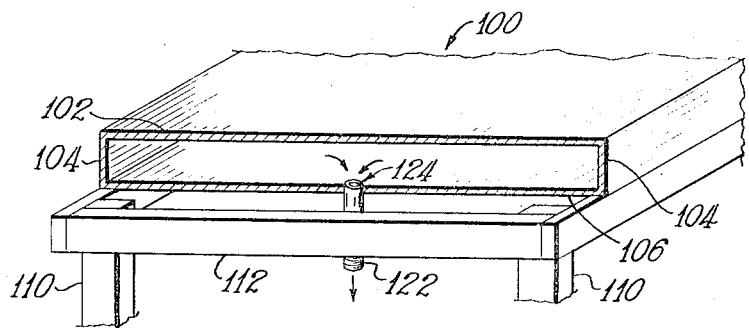
FIGURE 3 is an enlarged isometric section taken along line 3—3 of FIGURE 1.

Looking back now to FIGURE 1, note the gel plate which provides the first important physical (non-chemical) heating stage for initiation of the resin polymerization reaction. The gel plate is designated by the reference numeral 100. This is essentially a flat topped hot water tank of rectangular cross section as more clearly shown in FIGURE 3. Thus, gel tank 100 includes the flat top 102 of sufficient body to resist sagging between its end supports; it may be suitably augmented by braces and baffles, not shown, to preserve flatness. The sides are designated 104, and the bottom 106. A water-proof structure is provided by welding the elements 102, 104 and 106. End closure is provided by end plates 108 designated in FIGURE 1. The unit 100 is supported on legs 110 with cross stringers 112.

In FIGURE 1, it will be noted that tank top 102 is located at the same level as the top 82 of run out table 81. Thus, the wet laminate 80 slides along the production line on a level plane.

WATER FLOW IN GEL SECTION

In FIGURE 1, note that gel mold 100 receives warm water (100°–150° F. for example) at its down stream end from a heater 114. Water flows from the outlet of the heater through line 116 into the down stream end of the tank 100 by connection at point 118. The water then flows upstream through the tank 100, i.e. against the direction of movement of the wet lay-up 80. Water exhaust from tank 100 is at point 120. This outlet is better shown in FIGURE 3 and comprises a line 122 secured in an outlet opening 124 at the upstream end of tank 100. From the outlet opening 124, the return water flows through line 122 and back to the inlet of the heater 114.

From the foregoing, it will be understood that the wet lay-up 80 is always advancing against a slightly increasing temperature gradient; it first encounters the cooler end of the gel tank 100 and proceeds toward the warmer end. Thus, the polymerization reaction, which is exothermic in nature, is "kicked off" gradually or gently and is retained precisely in a controllable stage as it enters the forming mold section IV after having acquired a proper gel condition. This gel condition and the reason for forming a gel will be more clearly brought out during a discussion of the actual molding stage following, but it is pertinent to state here that the gel is carefully controlled and exotherm is not permitted to "run away." Thus, the gel platen 100 acts not only to initiate the resin polymerization reaction, but it also acts as a heat sink to absorb the heat of polymerization and thus precisely control the gel for the subsequent forming step. Note from the foregoing that the gel consistency is very precisely established and controlled to prevent or reduce running or flow during the contoured molding which follows.

Only a single gel platen is shown in the drawings and described above. However, operating conditions will dictate actual length of the gel section and temperature gradations to be maintained therein. Accordingly, the full scope of invention will include plural gel platens, controlled to different and appropriate temperature levels.

Although not shown, a surge tank may be optional for use in the gel tank water flow system.

The gelled lay-up is designated 125 in FIGURE 1.

THE MOLD AND CURE SECTION

In FIGURE 1, the bracketed section designated IV is the mold and cure section. This is characterized by matching top and bottom heated molds. In accordance with the present invention and the following description, it will be evident that a substantial degree of novelty is evident from this cooperative mold technique with control of the exotherm that takes place during the curing reaction which the resin undergoes.

THE BOTTOM OR FIXED MOLD

Figure 4:
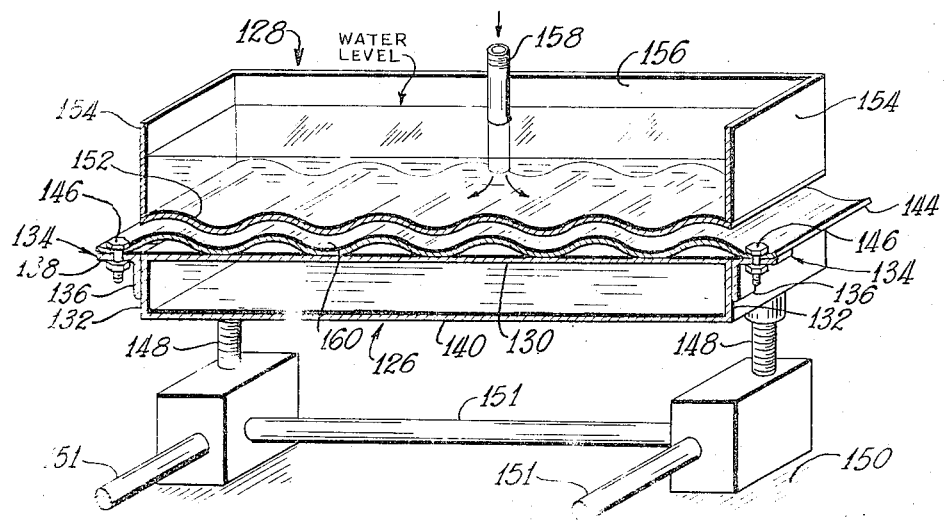
FIGURE 4 is an enlarged isometric section taken along line 4—4 of FIGURE 1.

First, it should be briefly noted that the bottom mold is designated by the reference numeral 126 and comprises essentially a flat topped water tank. The top mold is designated by the reference numeral 128, and is suitably built in the form of an open top water tank. Between these units is a cooperating pair of caul sheets or mold plates as shown in FIGURE 4.

The bottom mold 126 comprises a flat top tank generally similar to gel mold 100 but with a caul sheet of particular configuration separably held to the top for support and heat exchange purposes. Thus, the bottom mold 126 includes a flat rigid top wall 130, either of suitable structural cross section to retain a flat configuration, or under-supported with suitable ribs as where thinner stock is used. The tank sides are designated 132, and it will be noted that these are inset from the edges 134 of brackets 136 providing a fastening or bolting flange 138. The bottom 140 extends between the bottom edges of sides 132. End plates are provided at 142, FIGURE 6 to provide a water-tight structure.

Water inlet and outlet openings are provided at each end of the bottom mold tank 126 for circulation of water; circulation will be described later by reference to FIGURE 1. However, it can be mentioned that the water inlet and outlet openings are suitably of the same type as those typified in FIGURE 3, described above.

The bottom mold plate is held to the top wall 130 of bottom mold tank 126. This is designated 144, in FIGURE 4, and it will be noted that it is of corrugated construction for the production of corrugated panels. This mold plate 144 is suitably wider than the panel produced and is suitably wider than the top 130 of water tank 126. Accordingly, the bottom mold plate 144 extends substantially to the edges 134 of brackets 136 and bolts 146 are passed through the fastening flange 138 to secure the bottom mold plate in position.

From the foregoing, it will be noted that the bottom mold plate 144 is held firmly; is supported against sagging; and is in perfect heat-exchange contact with the top 130 of bottom tank mold 126. It will of course be understood that the mold plate 144 is fabricated of material having a high coefficient of heat transfer, such as aluminum.

The interchangeable mold feature of the present invention requires that the bottom tank 126 be vertically adjustable. For this purpose, jack screws 148 are provided. Actually, the bottom tank 128 provides enough weight to resist longitudinal movement against frictional passage of the laminate. Therefore, the tank can merely rest on top of the jack screws 148 for a very effective yet simple and trouble-free arrangement. A floor 150 provides support and spacer bars 151 can be used if desired.

THE TOP OR FLOATING MOLD

As mentioned before, the top mold is designated generally by the reference numeral 128. This is suitably an open top water tank. Referring to FIGURE 4, it will be noted that the bottom of the tank comprises a corrugated mold sheet 152 of mating configuration to the bottom mold sheet 144. It should be noted that this sheet is about .040″–.060″ aluminum and is therefore slightly flexible. Upstanding sides 154 and ends 156 secured as by welding complete the unit. Water inlet and outlet is suitably provided at each end by means of suitable lines, the one shown being designated by the reference numeral 158, and in this view, being the inlet.

A note at this point will highlight the advantages which accrue from the use of a flexible metal sheet in the bottom of the upper mold. Thus, the metal sheet, in being shaped, provides a true cross-sectional dimension for the panel being produced. By virtue of the fact that the metal sheet can be adjusted laterally, in mated relation with the under mold, exact cross sectional control of the panel being produced can be maintained. Thus, peaks and valleys of the finished panel can be made highly uniform in thickness.

In general, this is a self-seeking or self-compensating operation automatically inherent in the structure of the top mold; this is brought about by the manner in which the top mold floats on and cooperates with the bottom mold.

An operational feature of the flexible metal sheet upper mold resides in the fact it can ride over hard gel portions which may occasionally arise in the lay-up by reason of improper amounts of constituents or improper constituents. Upon passage of such hard gel portions, the flexible sheet rides over and then again reinserts itself or conforms perfectly into proper molding relation with the lower mold. Thus, there is no disruption of the process.

Further, the cover films are not torn or ruptured by such gel particles because of the automatic compensation in the upper mold.

Note that the width of top mold tank 128 is less than the bottom mold sheet 144 to provide clearance for the bolts 146 holding the bottom sheet in position. It should be pointed out that the bolt arrangement for anchoring the bottom sheet in position is illustrative only.

Further note, in FIGURE 4, that top tank 128 actually floats on the laminate which passes between the upper and lower molds in the space designated 160.

WATER FLOW IN MOLD SECTION

Referring again to FIGURE 1, it will be noted that circulation through the mold system is as follows:

From a heater 162, water flows through an outlet connection via line 164 to an inlet connection 166 at the downstream end of the bottom tank 126. Water then flows upstream relative to panel movement and through an outlet 168. The line 158 is attached to outlet 168 and leads to the inlet end or downstream end of the top mold tank 128 for entrance as at the point 170. Water then flows from the downstream end of top tank 128 upstream of the direction of travel of the panel to be picked up by an outlet line 172 for return to the inlet of heater 162 for reheating. It will be observed that the open top tank 128 serves as a surge for the water circulation system.

MOLDING RECAP

It may be observed at this point that the gelled lay-up 125 is molded and substantially completely cured during its passage through the molds 126, 128.

It should also be pointed out that a novel feature of the mold stage is as follows. The mold tanks 126, 128 act in three ways:

(1) As heat input at the entrance to completely develop polymerization;

(2) As a heat sink back from the entrance end to control the resin against overheating after the exotherm is established; and (3) A molding pressure medium to positively impart intimate mold contact and a desired configuration to the finished product.

TOP TANK TETHERING—FIGURE 5

As mentioned above, the top tank 128 floats on the top of the laminate 80 as it is pulled between the upper and lower mold sheets 152, 144; and thus provides molding and forming pressures. The manner in which the top tank 128 is restrained against movement by the laminate is shown best in FIGURE 5.

At the forward end of each side 154 there is provided a fastening pin 174 as by welding. A tie cable 176 is fastened at one end to pin 174. An anchor pin 178 is connected to a machine frame element 180 spanning the production line. Each tie cable 176 is fastened at its forward end to its respective anchor pin 178. It will be understood that turnbuckle means or other adjustable device is provided somewhere in the tie cable 176 for axial adjustment of the top tank 128 for exact alignment over the bottom tank 126.

MOLD CONTOURED ENTRANCE MOUTH

In order to provide smooth flow of the gelled laminate from the gel plate 100 in between molds 126 and 128, contouring is provided as follows. The bottom mold plate is tapered at its entrance edge. This is best shown in FIGURE 6. Note that the front end wall 156 of top tank 128 sets back from the front edge 182 of top plate 130 and front edge 183 of the bottom mold sheet 144 to allow the lay-up to "tuck in" before engaging the top mold. The bottom mold is contoured through the distance 184.

Each of the ridges 186 of bottom mold sheet 144 is flattened downwardly along the portion 184 in a gradual taper to the straight front edge 183. At the front 183, the ridges 186 and valleys all blend to a common line level.

Also the front edge of the bottom plate of the upper mold is contoured up in a similar manner, but through a shorter distance. This is shown at 157 in FIGURE 6.

The foregoing is an embodiment providing shape development right at the mold mouth.

Thus, the incoming laminate is gently flowed to the mold contour in a gradually changing profile from flat to corrugated. It will be evident that other mold contours will be provided with similar mold mouths. Of course, when producing true flat sheets, it will be evident that only an upward taper at the front edge of the top mold will be advantageously utilized.

ADVANCE SHAPE DEVELOPMENT

While discussing this aspect of the invention, attention is directed to FIGURE 6a. This figure illustrates the manner in which actual formation or shape development can be effected while the laminate is still on the gel plate 100. Thus the trailing end of the gel plate is contoured to match the bottom mold plate 144 of tank 126. This can be a straight transverse blend as shown in FIGURE 6. Preferably, however, this will take a V configuration, as indicated by numeral 101 in FIGURE 6a. This arrangement has the advantage of starting the shape development at the center of the lay-up and working out to each edge. This has a tendency to smooth the laminate and remove wrinkles from the cover films. This also aids in aligning the lay-up for good passage through the molds.

A tethered float 103 can be used at the center to aid in shape development and wrinkle smooth-out. This is positioned over the contoured area 101 and the bottom is contoured to mate with the area 101.

OPTIONAL WEIGHT DISTRIBUTION ON TOP MOLD FOR RESIN FLOW CONTROL

Figure 7:
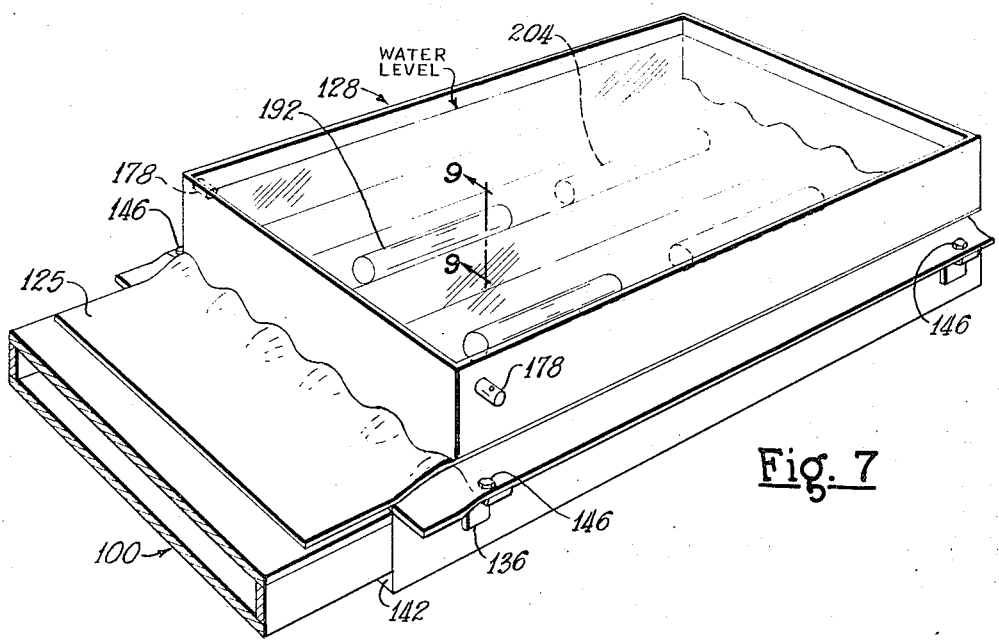
FIGURE 7 is a perspective view illustrating the optional addition of supplemental weights to the top mold for resin flow control.

By reference to FIGURE 7, it will be noted that steel or similar heavy bars 192 can be laid in the valleys between the ridges of the mold sheet forming the bottom of the upper tank 128.

As mentioned before, the condition of the gel of the resin lay-up passing from the heated gel plate 100 is controlled very precisely so that it can be formed into a corrugated section from a flat condition.

Figure 8:
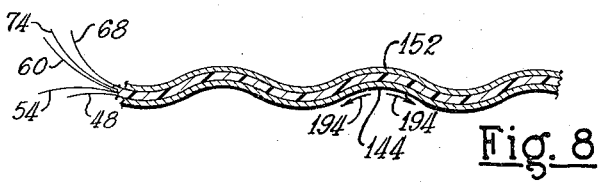
FIGURE 8 is an enlarged fragmentary section of a wet lay-up between mold surfaces.

However, in a continuous production operation, conditions often change from day to day or sometimes from hour to hour. Periodic checks, of course, are made of all components during processing. However, there are times where a certain resin batch or humidity condition or other will prevent attainment of the exact gel consistency. Such conditions may cause the gel to drop slightly below the desired level. When this condition exists, it will be evident, as shown in FIGURE 8, that the resin at least in the initial or entrance end of the mold section will tend to flow down hill in the arrow 194 direction.

Figure 9:
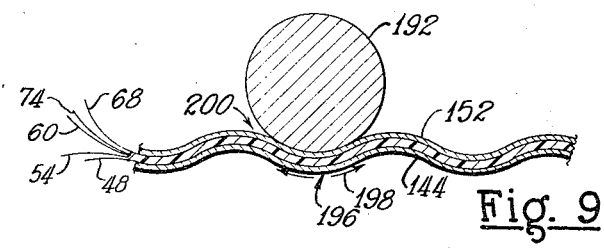
FIGURE 9 is an enlarged section along line 9—9 of FIGURE 7.

Under such conditions, specific supplemental mold weight is highly desirable to prevent production rejects. Accordingly, the bars 192 can be placed at the forward end of the top tank 128. The action effected by such bars is illustrated in FIGURE 9. It will be noted that the round steel or lead bar 192 is utilized; this provides a maximum concentration of pressure at the bottom of the trough indicated by the arrow 196. This type of weight tends to counteract any gravitational resin flow, as indicated by the forces designated by the arrows 198. Thus, the weight resists any tendency for the resin or panel to become thickened at the bottom of a trough as at 196 and thinned at the top of a ridge as designated 200.

The foregoing pressure concentration will generally be required relative to a resin gel stage where the resistance to flow is quite high; thus just short of a perfect gel. On the other hand, there may be conditions of gel wherein the resistance to flow would be not quite so great, i.e., a still lower degree of gel. Thus, a force concentration as at the bottom of the trough such as point 196 in FIGURE 9 would not be desirable because of a tendency to form a thin section at such point due to forcing away too much resin.

Figure 10:
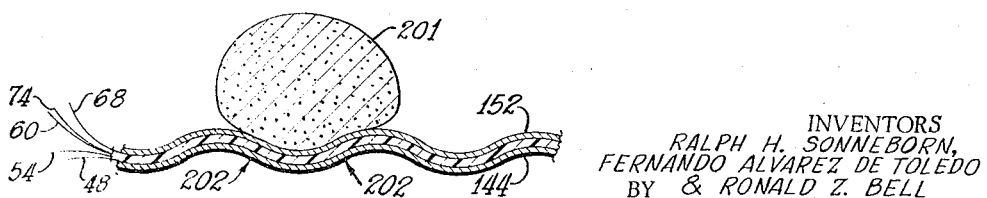
FIGURE 10 is a section similar to FIGURE 9, illustrating use of a shot bag instead of the iron bar of FIGURE 9.

Accordingly, the extended scope of invention would include the use of tubular lead shot bags as shown in FIGURE 10 for optional use in place of the steel or lead bars 192 of FIGURE 9.

In FIGURE 10, it will be noted that the sand bag 201 distributes its pressure over a general area of the trough at least about half way up to the top of the ridge as designated by arrows 202. Thus, where a resin is slightly more fluid than in the conditions of FIGURE 9, the set-up of FIGURE 10 will provide panel thickness uniformity.

Referring back for a moment to FIGURE 7, it will be noted that the weight 192 may be moved along the bottom of the top tank 128, as for example, to the optional position designated 204.

It will be understood from the foregoing that the added weights provide localized pressure greater than that provided by the water alone.

DRIVING MECHANISM

As the molded panel, designated by the reference numeral 206 moves out of the mold space 160, it passes between rotatable drive wheels 208, FIGURES 1 and 5. These wheels are covered with rubber to engage the upper and lower surfaces of the now rigid panel and grip the panel and pull it along providing propulsion from left to right of FIGURE 1.

THE CURING OVEN

After leaving the drive wheels 208, the panel passes through the oven 210 where it is post cured to a substantially completely polymerized condition. The effect of the post cure is to reduce residual monomer to a low level, about 1% or lower. This oven can be a hot air oven; however, an infra-red oven is preferred because of uniform heating and penetration to the center of the panel. This tends to make the polymerization proceed from the center out and is believed to enhance surface finish. Further, an infra-red oven is preferred because of the fact that the entrance and exit mouths can be left open without appreciable energy losses.

This oven preferably operates at a temperature of about 280° F. when using acrylic resin systems.

An additional effect of the oven is to relieve any molding stresses where the exotherm was relatively high.

The panel is thereafter designated 212, now being in a completely cured state just before a cut and pack operation. Auxiliary drive wheels 214 are provided at the exit end of oven 210. These provide the force necessary to push the fully cured panel strip 212 through slitter saws off to the right. The panels are very tough and, accordingly, a substantial amount of force is required to feed it to and through the slitter saws.

The cut and pack section is designated by the reference numeral 216, and is only generally indicated because of the conventional slitter saws and transverse shears used therein.

Having provided a fairly detailed but general description, it is now believed that certain important processing details should be brought forth in the light of the foregoing discussion.

COVER SHEET TENSION CONTROL

During prior discussion of the pre-heat or humidity compensation section, attention was directed to the infrared heater 84. This provided humidity compensation in the cover sheets 48 and 68 and warmed the entire wet lay-up in such manner as to let it flatten. As the lay-up moves forwardly towards the end of run out table 81, lateral tension is gradually applied to assure flatness and proper forward feeding.

Figure 11:
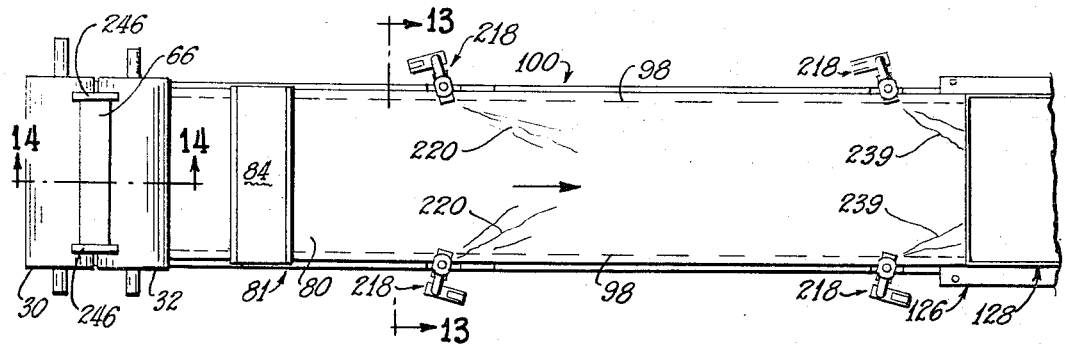
FIGURE 11 is a top plan view of the wet lay-up run out table and gel plate illustrating placement of tensioning rolls to maintain lay-up flatness and to accurately guide the gelled lay-up into the forming molds.

As shown in FIGURE 11, opposed tension roll sets 218 are provided to grip the edges of the cover films at a position to the exit end of run out table 81. At this point, it will suffice to say that each tension roll set 218 comprises an upper and lower rubber cover roll, canted as indicated relative to the line of movement of the wet lay-up 80. The edges of the cellophane cover sheets pass through the nip between each pair of rolls. Tension is thus applied in the general direction of the lines 220 to provide stretching all the way from the forming nip roll 32, positioned just to the left of the infra-red heater 84, FIGURE 11.

Figure 12:
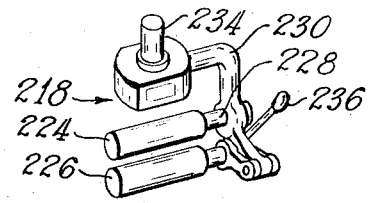
FIGURE 12 is an isometric view of a tension roll set.

At this point, reference is made to FIGURE 12 to illustrate the general configuration of the tensioning roll sets 218. These comprise upper and lower elongated cylindrical rollers 224 and 226. These rolls comprise a steel shaft with a bonded tubular rubber coating to grip the cellophane cover sheets of the wet or gelled lay-up. The shafts are alike and are accordingly designated by the reference numeral 228. The exposed ends of shafts 228 are carried within bearings mounted in an arm 230. The upper end of arm 230 includes a housing that has a clamp portion for mounting to an overhead post 234. Proper orientation of the rolls 224, 226 relative to the lay-up 80 is made by establishing the relation on the mounting post. A handle 236 adjusts running clearance.

Figure 13:
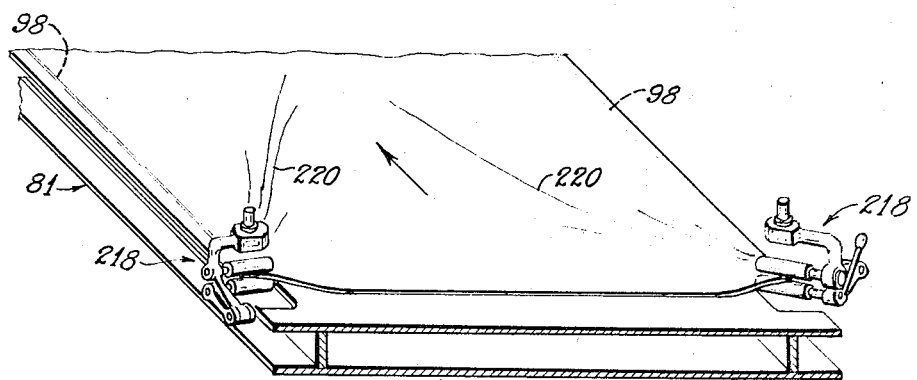
FIGURE 13 is an isometric section taken along line 13—13 of FIGURE 11 illustrating the effect of the tension rolls in flattening the wet lay-up.

By reference to FIGURE 13, it will be noted that the lay-up 80 is gripped along the terminal edges outside of the mastic line 98 generally designating the approximate panel limit.

Referring again to FIGURE 11, it will be noted that a set of tensioning rolls 218 also can be provided at the outfeed end of the gel plate 100 to provide tension along the stress lines 239 just prior to entry between forming molds 126, 128.

It should be pointed out that an important purpose of the side tension rolls is to compensate for forward processing tension.

THE IMPROVED WET LAY-UP FORMATION THROUGH THE VERTICAL NIP ROLLS WET OUT AND DEGASSING

Figure 14:
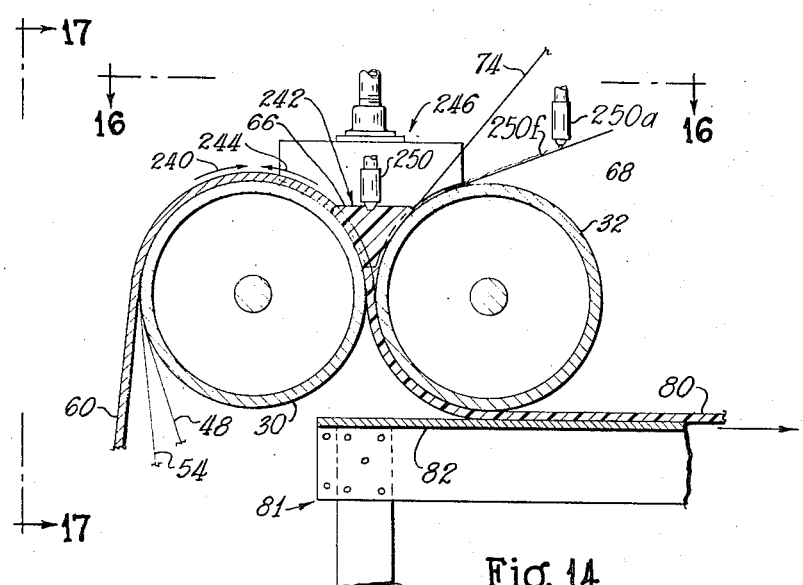
FIGURE 14 is an enlarged section of the nip roll forming section, taken along line 14—14 of FIGURE 11.

Referring to FIGURE 14, note that the bottom cover film 48, bottom surface mat 54 and reinforcement mat 60 are lapped over the top half of nip roll 30; thus a tangential entry of the mats into the resin 66 is provided. This is indicated by reference arrow 240.

Production line speeds are on the order of several inches to a few feet per minute. Rolls 30, 32 are of a preferred size in the range from 6 to 8 inches in diameter; thus, a slow and gradual entry of the mat components into the resin bath 66 is provided. Noting the resin liquid level line 242, it will be evident that the slow movement along tangential arrow entry line 240 permits the resin to force out all gases from the mats 54, 60 along the line 244. Due to the relatively slow mat speed, the resin gently rolls around every fiber of the mats and thoroughly wets the fibers. This produces complete degassing of the mats; further the action is so gentle as to prevent fiber washing. At higher speeds added monomer in the resin system and more readily soluble mat binder will enable the same effects to be provided.

Top surface film 74 at the upper right of FIGURE 14 is also gently wetted and degassed in the same manner.

A further advantage is evident from FIGURE 14. By virtue of the fact that the reinforcement mat 60 and bottom surface mat 54 half lap nip roll 30, they are gently fed or carried into the nip in unstressed condition as contrasted to being pulled by the forward movement of the cover films of the wet lay-up and subsequently by the cured panels. This provides a very gentle entry and wetting action and prevents distortion and abuse to any of the components making up the panel system. Adjustment of resin viscosity of course contributes to proper wet out.

RESIN APPLICATION

Figure 15:
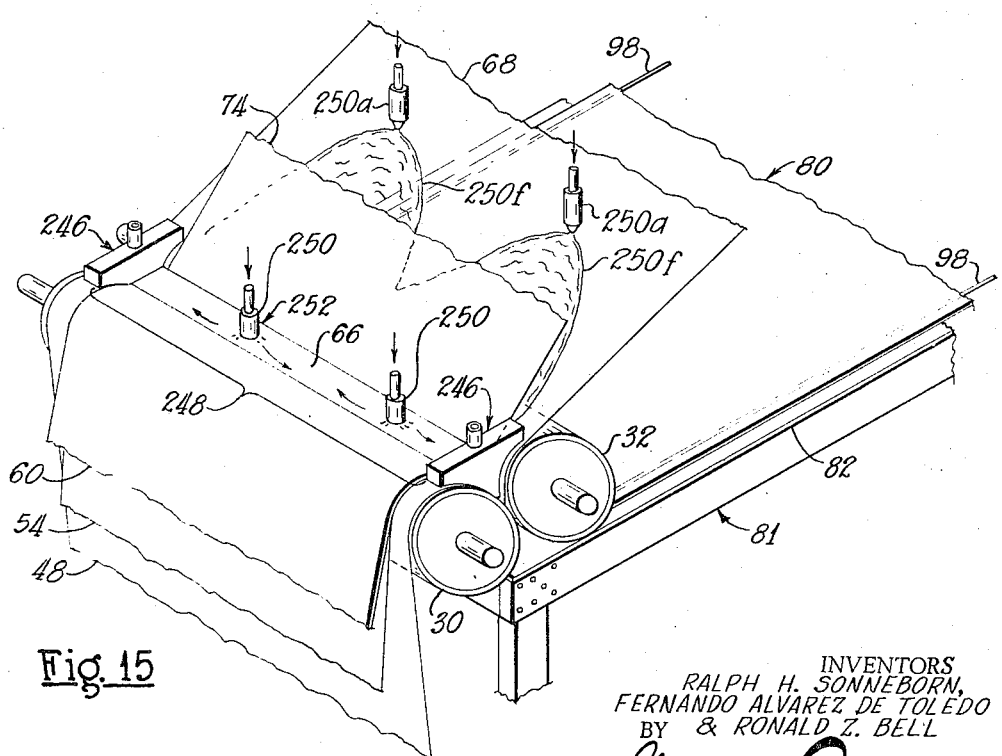
FIGURE 15 is an isometric view of the nip roll section of FIGURE 1 illustrating edge mastic application and liquid resin addition.
Figure 16:
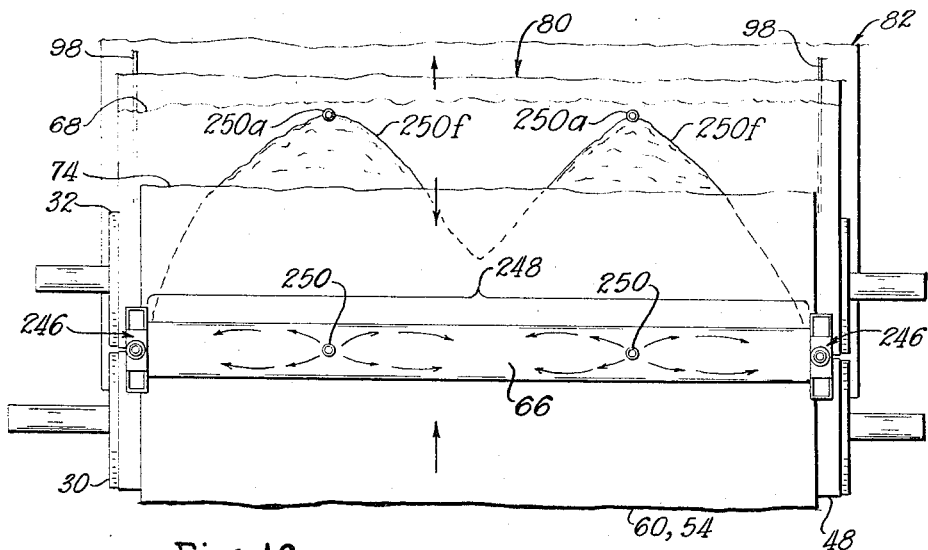
FIGURE 16 is a plan view taken along line 16—16 of FIGURE 14.
Figure 17:
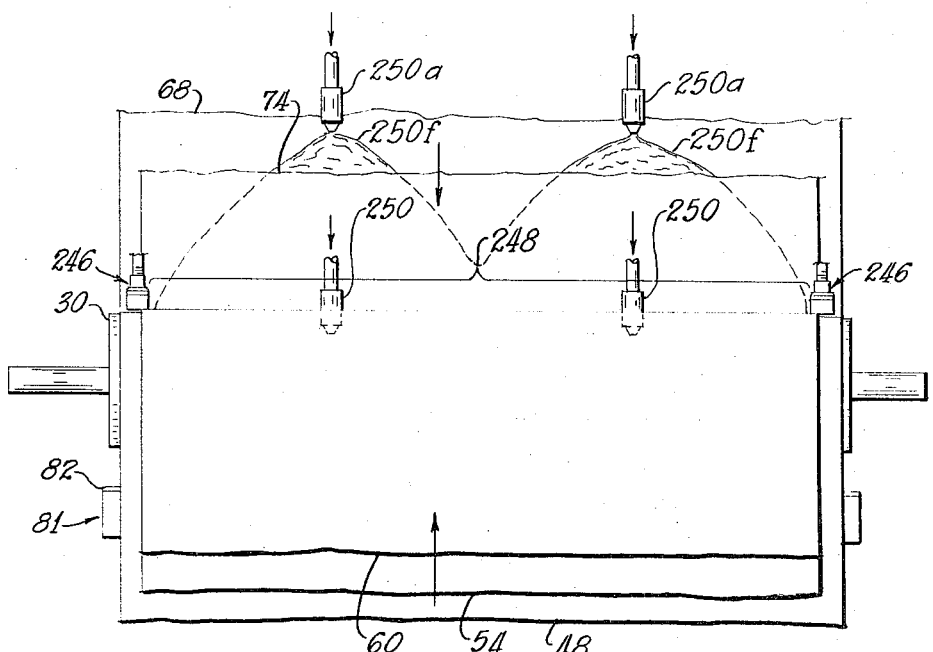
FIGURE 17 is an elevation taken along line 17—17 in FIGURE 14.

Referring now to FIGURES 15, 16, and 17, resin application to provide proper flow and wetting without distortion of the mat will be described.

It will be noted that nip rolls 30 and 32 are of a length slightly greater than the total width of the cover films 48 and 68. As best shown in FIGURE 15, the mats 54, 60 and 74 are a few inches narrower at each edge than the cover films. Between the edge limits of the cover films and the edge limits of the reinforcement and surfacing mats, there are provided mastic applicators designated by the reference numerals 246. As will be discussed later and more specifically relative to FIGURES 18 and 19, these are inverted generally triangular devices containing flow passages of specific configuration and capable of supplying a continuous bead of mastic inwardly of the edges of the cover films to prevent resin runout.

FIGURE 2 shows the manner in which the mastic beads 98 are slightly beyond the edge limits of the reinforcement mats but inwardly of the edge limits of the cover films 48 and 68.

The resin pool 66 is formed between the limits established by the mastic applicators 246. These act as dams to retain the resin in the nip.

It has been found quite important that this resin pool 66 be maintained in a specific manner. The length of the resin pool is designated by the bracket reference numeral 248. Establishing the length of the resin pool 66 by the reference numeral 248, note that two resin fill nozzles 250 are provided at about one-fourth of the distance 248 inwardly from each of the mastic applicators 246. As better shown in FIGURES 16 and 17, the resin deposited in the trough formed by the nip rolls 30 and 32 moves in each direction laterally away from the points of deposition. By so operating, it has been found that only two entry points are necessary, thus providing flow for one-quarter of the width of mat formation and such flow being of such a gentle nature that washing of mat fibers and distortion of fiber lay in the mats is prevented. This provides most effective and economical resin application with minimum equipment.

A further important point relative to development of the resin pool is illustrated in FIGURES 14–17. Thus the nozzles 250 have the delivery ends submerged in the resin to deposit the resin below the surface without turbulence as might be developed by a stream dropping through the air. This prevents air pick-up, as previously pointed out, the presence of air in acrylic systems presents a serious problem. Thus one more aspect of the invention is provided for control of that factor.

In view of the foregoing, it will be noted that a resin flow at the nips is balanced, and no appreciable flow streams are present.

An alternate procedure for introducing the resin syrup into the nip to form a bath 66 is also illustrated in FIGURES 14–17. This comprises positioning the feed nozzles 250 upwardly from the nip over the top cover film. This is designated position 250(a), (250 alternate position).

With the nozzles 250(a) positioned just above the surface of the top film 68, the resin is deposited on the films as a coherent stream, i.e., without picking up air. The stream spreads into a thin film 250(f) and flows by gravity down the cover film 68 and into the pool 66 without turbulence.

This method is advantageous in two aspects:
(1) No air is picked up because of lack of turbulence of flow; and
(2) Any gas which might be present in the syrup is actually exposed and released while the resin is flowing in the film stage 250(f).

It is to be understood that other methods of deposition than from the nozzles 250(a) can be utilized within the scope of invention. These however are relatively inexpensive, very practical, and can be adjusted and cleaned easily.

The extreme detail with which the resin application has been described hereinbefore may appear burdensome. However, it must be understood that the resin is a relatively high viscosity material and picks up air readily. Thus careful deposition prevents fiber washing and air occlusion.

Therefore, the present invention depends for its success upon the correlation of several factors, among them being:
(a) Resin viscosity;
(b) Resins of a certain formulation and accelerator content;
(c) Resin application in a delicately controlled manner to prevent fiber washing and mat deformation;
(d) And the use of delicate surface mats to hold resin at the surface and provide resistance to surface erosion; and consequently due to the delicateness of such surface mats to the use of a carefully correlated manner of liquid resin application of specified viscosity.

THE MASTIC BEAD APPLICATORS

Figure 18:
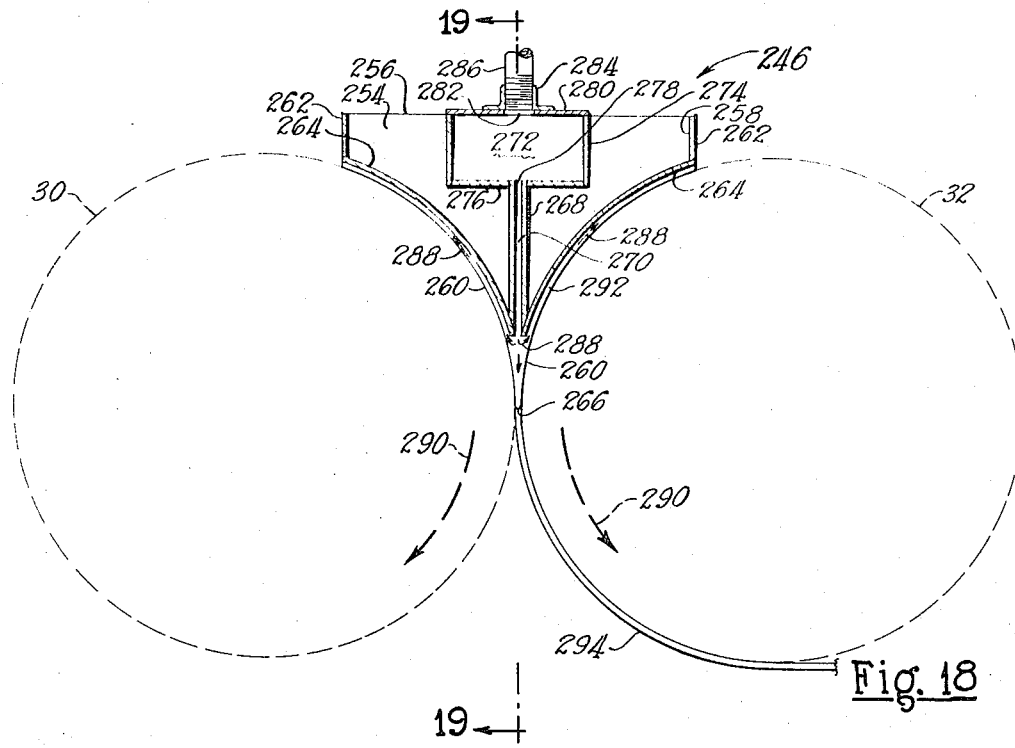
FIGURE 18 is a longitudinal vertical section through the mastic applicator used in the invention.
Figure 19:
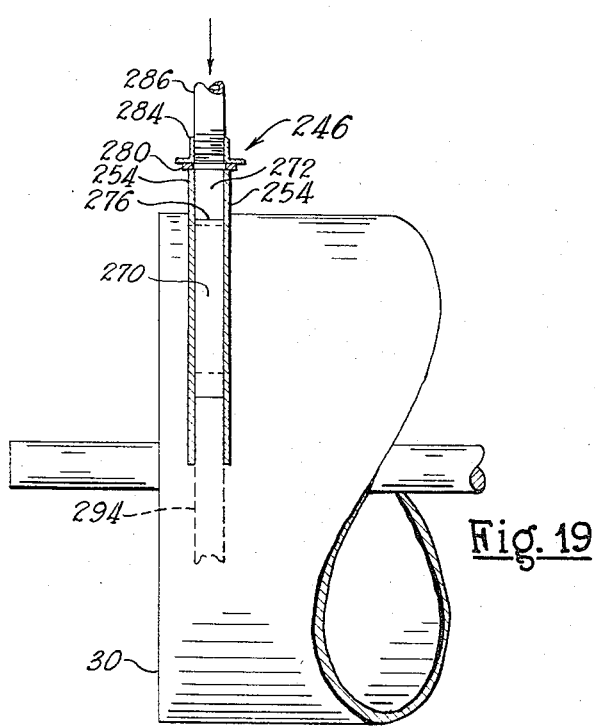
FIGURE 19 is a section taken along line 19—19 of FIGURE 18.

As shown in FIGURES 18 and 19, each mastic applicator for vertical nip use is designated by the reference numeral 246. These are characterized by steel side plates 254 of particular configuration. Thus, each plate 254 has a straight top edge 256, vertically disposed end edges 258 and symmetrical arcuate bottom edges 260. The arcuate bottom edges 260 run in very close contact to the nip rolls 30, 32.

Between the vertical end edges 258 there are provided end plates 262. Extending downwardly from the bottom edges of the end plates 262 in an arcuate manner paralleling the edge 260 are symmetrical bottom walls 264. It will be noted that these walls 264 terminate short of the tip 266 of side plates 254. Extending upwardly from the bottom ends of the walls 264 are spaced walls 268; these extend between side plates 254 to form a conduit 270. The walls 268 extend upwardly to the bottom of a three-sided container 272 formed by side walls 274 and bottom wall 276. Note that the bottom wall 276 is split at the center to provide an outlet 278 connected with conduit 270.

Across the top of wall 254 there is provided a horizontal cover plate 280. Plate 280 is centrally apertured at 282 and a pipe flange 284 is welded in axial alignment over aperture 282. A conduit 286 is threaded at one end into pipe flange 284. Conduit 286 leads from a pressurized source of mastic not shown.

From the foregoing, it will be understood that pressurized mastic flowing through conduit 286 first enters chamber 272, thence follows outlet 278 into conduit 270 downwardly toward tip 266. Since edges 260 lie close to the periphery of the rolls 30, 32, the pressurized mastic will meet resistance by encountering the peripheries of the nip rolls and be reversed in direction as indicated by arrows 288 to flow upwardly against the direction of rotation 290 of nip rolls 30, 32.

From the foregoing, it will be understood that the peripheries of the nip rolls 30, 32 and edges 260 of two side plates 254 and symmetrical bottom walls 264 form curved channels 292.

From the foregoing, it also will be understood that rotation of the nip rolls in the arrow 290 direction with application of pressurized mastic will produce a ribbon 294 of about one-half inch width actual size.

This detailed description of the mastic applicator is provided because the applicator is a co-ordinated component of the system. Note that incoming mastic is wiped into the nip.

There is a reverse flow up along the channel 292. The opposite rotation of the nip rolls forms the wiping action for uniform application of the mastic in a manner not distorting the cover films.

An entirely different result follows if it be visualized that the walls 264 are omitted so that the entire interior defined by walls 254 and 262 and capped at the top, be filled with pressurized mastic. It would thus be evident that mastic pressure onto the nip rolls would be over a very broad area. Naturally, this would tend to force the applicator upwardly and out of the nip and, of course, impose a great load on the cover films and severely distort them. To hold the mastic applicators in position would require a substantial support. This, of course, would cause reaction against the cover films.

In contrast, note the delicacy evident from the present invention. Thus, the nip rolls tend to draw the mastic applicator very gently into the nip and impose substantially no load or shearing action against the cover films. Only a lateral positioning device is necessary for retaining the mastic applicator 246 in position. Thus the mastic applicator actually floats on the nip rolls and the slight drag by the tacky consistency of the mastic tends to retain the applicator in a self-gauging position for mastic ribbon formation in the nip.

MASTIC APPLICATOR—ALTERNATE CONSTRUCTION

Figure 20:
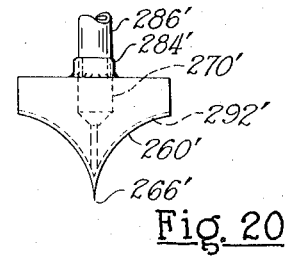
FIGURE 20 is a side elevation of an alternate construction of the mastic applicator.
Figure 21:
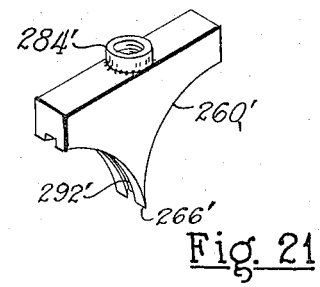
FIGURE 21 is an isometric view of FIGURE 20.

FIGURES 20 and 21 show another manner of constructing the mastic applicators. Thus this unit is machined from a solid block of metal such as aluminum, with the bottom profiled as two arcuate edges 260' converging to the point 266'. Each arcuate edge has a mastic groove 292' formed therein.

A feed channel 270' is bored through the body into connection with the grooves 292' and a flange 284' and feed line 286' fitted at the top.

It will be evident that as mastic is forced to the point of the nip, as at 266', it will be moved up the grooves 292' due to engagement between surfaces 260' and nip rolls 30, 32. Thus opposed strips of mastic are attracted onto or adhered to each cover film as the films pass between the arcuate surfaces of the roll and applicator. These are molded as they pass through the nip, providing a perfect air seal.

It has been found desirable to apply an anti-friction coating, such as Teflon, along the edges 260' to improve the free riding qualities of the unit in the nip and prevent binding with the cover films.

Thus, subtlety of invention is evident by the use made of the materials, namely, the tacky characteristic of the mastic, the direction of rotation of the nip rolls, the movement of the cover films, the adhesive attraction between the mastic and the cover film and the weight of the mastic applicator in combination with the draw to floatably position it in the nip in a self-gauging or self-adjusting application position.

In summary, the mastic applicators provide the following:

(1) Thickness control;
(2) Dam action;
(3) Air exclusion;
(4) Waste reduction; and
(5) Practical elimination of resin-rich edges.

AN INTEGRATED SYSTEM—FIBER FORMATION TO FINISHED PANEL

It is within the scope of the present invention to attach a mat forming section to the front end of the machine shown in FIGURE 1 and thus provide a completely integrated process from fiber formation to finished panel ready for shipment.

In the light of this brief introductory statement, there now follows a complete description of a completely integrated system showing varied modifications whereby the mat as it is formed can be applied in various ways between the nip rolls for lay-up formation.

MAT FORMATION

Figure 22:
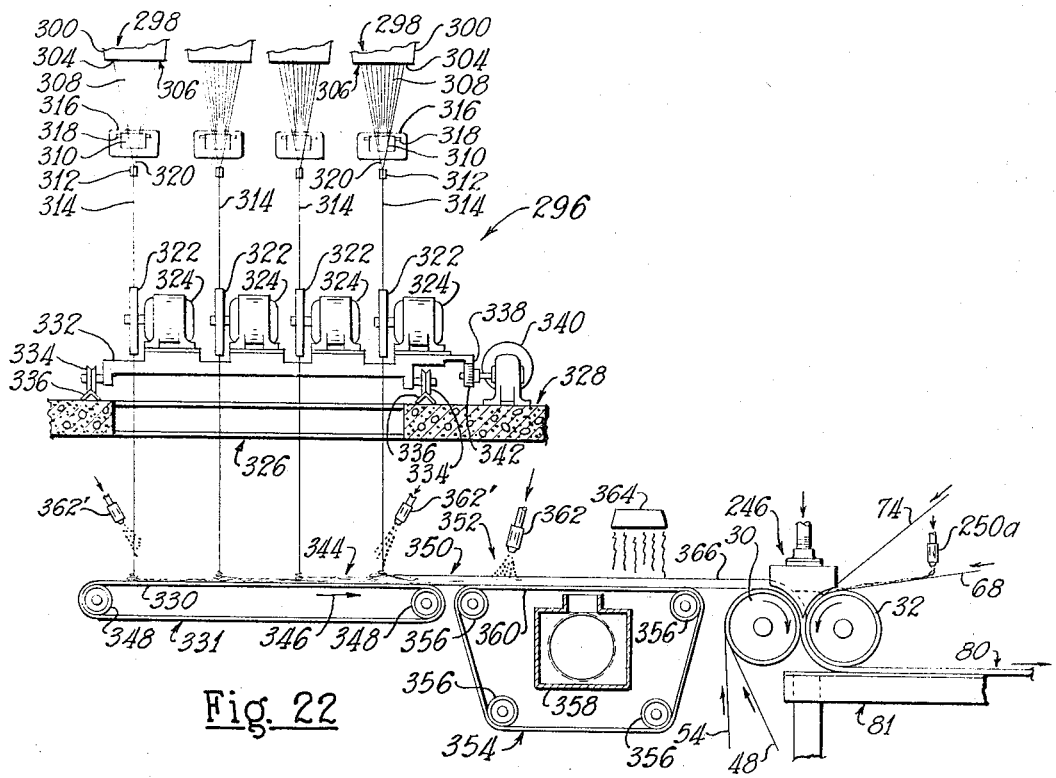
FIGURE 22 is a side elevation of apparatus for forming reinforcement mat from raw fiber, at the head end of a machine typified by FIGURE 1.

Referring to FIGURE 22, it will be noted that the reinforcement mat is made from a plurality of strands each containing a plurality of continuous fibers.

More particularly, FIGURE 22 illustrates a mat production unit 296 for making lofted mats from randomly interfelted strands of continuous glass fibers. The production unit 296 includes a plurality of continuous fiber forming bushings 298. Each bushing 298 includes a body portion 300, suitably fabricated of high temperature resistant platinum alloy. The alloy is also corrosion resistant to the glass being melted therein. Electricity is passed through the length of each bushing 298 by connection of suitable lead lines to end terminals, not shown. This provides resistance heating to glass melting temperatures of about 2000° F. and is controllable by regulating current flow to establish the proper glass viscosity for fiber formation.

Glass materials such as marbles, cullet or other are fed to each bushing 298 as by a top opening, not shown, to form a body of molten glass.

At the bottom, each bushing 298 is provided with a plurality (about 200) of aligned molten glass feed openings or tips 304. Molten glass from within each bushing 298 flows through each tip 304 as a small molten stream 306.

When the streams 306 are drawn out or attenuated at high speed, they are reduced in diameter and converted into continuous raw fibers 308. These fibers are of a diameter in the range of about 15 microns and up.

Inasmuch as the mats used in the present invention are preferably substantially dry or binder free, the fibers are processed into mats as near the nascent state as possible. Accordingly, the raw fibers 308 are passed tangentially over a sizing belt 310. Belt 310 is moved through a liquid bath of size to provide application to the fibers. By the tangential contact provided by the belt 310, only a very light coating of size with a little lubricant is applied. No mat binder is employed. The size is just of a sufficient adhesive nature to hold the fibers together and provide appropriate strand integrity. However, it is to be emphasized that accelerator for the resin system can be introduced at this point.

The size is compatible with acrylic resin formulation described before, and thus is designed for optimum resin wet-out and minimum gas occlusion during wet lay-up formation at the nip rolls described hereinbefore.

From the sizing belt 310, the coated fibers converge downwardly over a guide block 312 and thus are directed into strand form 314.

Though not shown in detail, the belt 310 runs over a powered roll within a container 316 for the liquid size. The belt 310 also runs over a guide rod 318 positioned at the fiber contact line. The container 316 is provided with liquid size at an appropriate level and from a suitable supply system. The guide rod 318 forms belt 310 into a sharp reversed curve for tangential fiber contact. This arrangement provides a highly effective wiping action for the liquid size from the belt 310 onto the fibers. The coated fibers are designated 320. Application of the size onto the fibers is in the form of a very uniform, but very thin, coating.

The strands 314 pass downwardly between the peripheries of corotating pull rolls 322. Pull rolls 322 are mounted on the shafts of synchronous motors 324. The pull roll action provides the attenuating force to convert the molten streams 306 to raw fiber 308.

The pull roll action also "throws" the strands 314 downwardly through opening 326 in a support floor 328 and onto the upper flight 330 of a collecting chain 331.

To provide uniform strand distribution and even mat lay and uniformity, a reciprocating motion is induced into the strands 314. This is suitably effected by mounting the drive motors 324 for pull wheels 322 on a movable carriage 332. Carriage 332 is mounted on rollers 334 riding tracks 336. Along one side of the carriage 332, right side shown, is a toothed rack 338. A reversible gear motor 340 is mounted on floor 328 with its drive gear 342 engaging rack 338. Alternate reversing of the motor 340 is effective to reciprocate the carriage 332 a sufficient distance for desired speed and throw of strands 314 onto collecting flight 330 for proper mat formation.

It will thus be understood that as pull rolls 322 are turned at appropriate speeds, are also reciprocated an appropriate distance across the width of collection flight 330, strands 314 are thrown downwardly in a random, ringlike fashion. These deposit on collection flight 330 and simultaneously are distributed across the width of the flight. The mat is thus laid up in gradual increasing thickness 344 and moves to the right in the arrow 346 direction.

Collection chain 331 is a continuous loop supported by rotatable rolls 348. At least one of the rolls 348 is powered to move the chain 331 at an appropriate production line speed. At the right hand end of the collection flight 330, a full thickness mat is developed, designated by the reference numeral 350.

A number of ramifications are evident in this mat forming system. Thus the end bushings can produce finer fibers and in effect form surfacing mats directly on each surface of a reinforcement mat, the latter being made of heavier fibers. Thus a unitary, triple component reinforcement surfacing mat can be produced for later processing.

The full thickness mat 350 moves from collection flight 330 across to an accelerator application section 352. This section 352 suitably includes a continuous chain 354 supported on rolls 356, at least one being powered at production line speed. A suction box 358 is positioned beneath the upper flight 360. Above the left hand end of upper flight 360 is at least one spray 362, for applying liquid accelerator composition.

This composition suitably comprises an innocuous liquid vehicle containing an appropriate amount of accelerator for the resin system. At this point, it is to be understood that the broad scope of invention would include application of powdered accelerator at this point by proper manipulation in an integrated manner with a slightly adhesive forming size-containing mat 350.

Also, it is to be understood that accelerator can be applied to the mat as it is being collected, as by the alternate nozzles 362'. By operating in this manner, a very uniform distribution through all of the strands of the mat will be provided.

For the sake of clarity of the present description, however, presume application of a liquid accelerator system by spraying downwardly on the mat 350 from the spray head 362. To the right of the accelerator applicator 362 is an infra-red heater 364. The purpose of infra-red heater 364 is to lower the liquid level and reduce the composition to a sticky, gel-like stage. This provides optimum wet-out by the liquid resin applied later. This, of course, is optional and may be omitted when the air dry action of the suction box 358 reduces the accelerator liquid content to a proper resin wet-out condition.

Proceeding to the right from the accelerator application section 352, the accelerated mat 366 moves to a vertical nip set up similar to that previously described. Note that the bottom cover film 48 is fed into tangential contact with entry roll 30 and half laps that roll for delivery to the nip. The bottom surfacing mat 54 is also fed into tangential contact with the nip roll 30 and onto the top of the bottom cover film 48 for support.

Note that the accelerated reinforcement mat 366 moves in horizontally upon the bottom surface mat 54 and that both are supported and moved forward by the bottom cover film 48. Thus, no stress is applied to mats 54 and 366; stretching and distortion are avoided.

Resin application by nozzle 250(a) on the top cover film 68 is indicated at the right.

As indicated at 246, a mastic applicator of the configuration shown in FIGURES 18–21 is utilized to apply a mastic bead at each edge of the lay-up as it is formed and retain the liquid resin within bounds as it enters the nip rolls 30, 32.

From the point of completion at the nip between rolls 30, 32, the wet lay-up is designated 80, as previously, and from here on, processing is the same as described relative to FIGURE 1. This includes cure in the very particular manner described as adapted to the particular resin system.

In this embodiment of the invention, note the tangential entry of the top surface mat 74 into the nip for proper wet-out and degassing, even though the wrap on roll 30 is not quite as great as in FIGURE 1.

TRUE VERTICAL NIP FORMATION—FIGURE 23

In still another embodiment, a full thickness mat 350 comes from a mat forming unit such as 296 of FIGURE 22. The mat 350 moves across flight 330 to flight 360 of chain 354 and traverses suction box 358 for accelerator application and set as at 362, 364.

In this embodiment, a hold down roll 394 is provided at the exit end of flight 360 of chain 354. Here, it will be noted the nip rolls 30, 32 are positioned higher than the flight 360 as contrasted to FIGURE 22. This provides the same nip roll wrap as in FIGURE 1. In general, a slightly enhanced mat wet-out and degas is provided by this type of entry. The nature of this type of wet-out is set forth fully above relative to the description of FIGURE 14.

In view of the foregoing, namely, the various nip roll ramifications of FIGURES 1, 14–17, 22 and 23, a truly versatile system of wet lay-up formation is provided.

OPTIONAL ACCELERATOR

Figure 23:
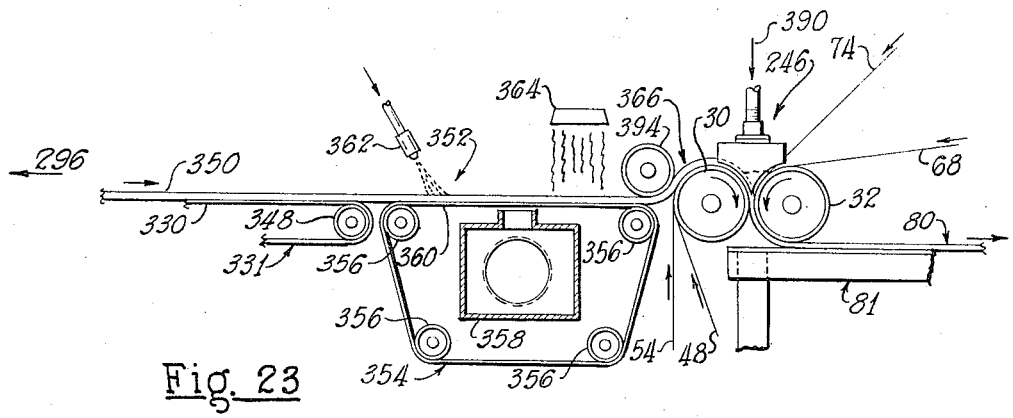
FIGURE 23 is a side elevation of apparatus similar to FIGURE 22 but illustrating continuous laminate formation in accordance with the nip roll wrap characterizing FIGURE 1.

In FIGURES 22 and 23, the accelerator is shown as being applied to the reinforcement mat 350. Admittedly, this provides the substantial ultimate in resin curing by the careful admixture of the accelerator with all parts of the resin. Further, this admixture in the resin is at the point of wet lay-up formation. Thus, an extended pot life for the resin is provided which otherwise is not the case as where the accelerator is applied either in whole or in part by pre-mixing with the resin syrup.

As discussed in the early part of this description, the invention does include addition of accelerator to the resin at a pre-mix station. This manner of operation is also possible with the apparatus and process of FIGURES 22 and 23. Accordingly, the accelerator spray 362 is merely shut down; however, the infra-red unit 364 may be continued for cool weather operation or humidity control to condition the mat for improved resin wet-out.

MODIFIED PROCEDURE

When operating in accordance with the flow system of FIGURES 22 and 23, it may be desirable to reduce the heat input at the pre-heat stage II of FIGURE 1. This will prevent the resin polymerization from being prematurely initiated and the exotherm go "wild" before the heat sink provided by the gel plate 100 is reached. Should this happen, resin boil may be encountered. This will also prevent the gel stage for best molding from being exceeded with the result that the shaping provided by the upper and lower molds 126, 128 is retained.

RESIN PRE-MIX SYSTEM

Figure 24:
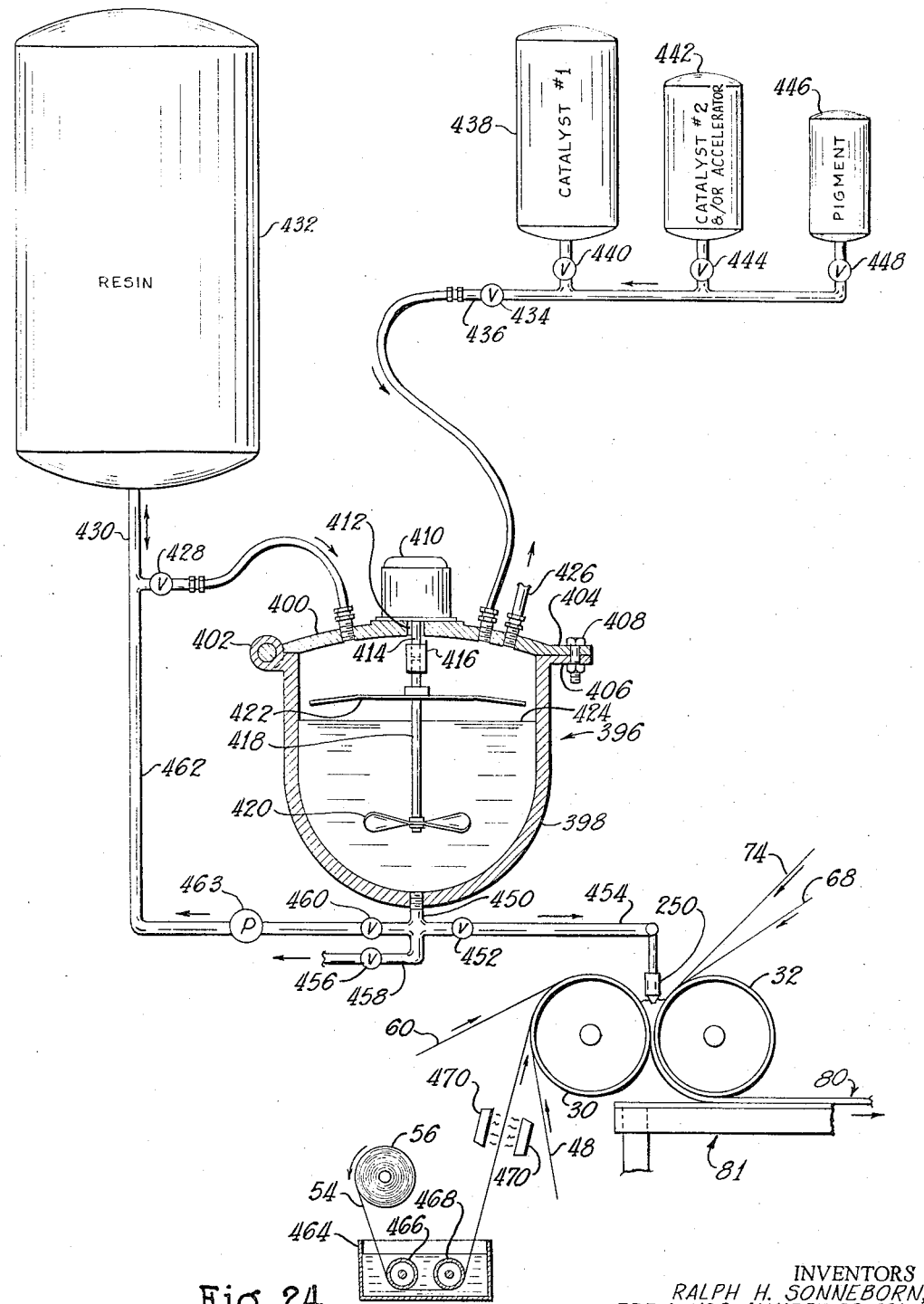
FIGURE 24 is an elevation, partly in section, of a resin mix and delivery system for application in the invention.

A very satisfactory resin pre-mix system for use in the present invention is illustrated in FIGURE 24. As there shown, a pressure resistant mixing and degassing kettle 396 is utilized. The kettle 396 includes a lower shell 398 and a cap 400. The cap 400 is hinged at 402 and has a flange 404 engageable with a corresponding flange 406 on shell 398. Bolts 408 provide a lock; and a suitable gasket may be included between flanges 404 and 406 to assure positive seal.

A sealed motor 410 is mounted at the top of cap 400. Motor 410 has a shaft 414 that extends a short distance through cap 400. A coupling 416 is provided at the lower end of shaft 414. A stirrer shaft 418 is connected in depending relation to coupling 416. Shaft 418 carries a propeller stirrer 420 and a degas spin disc or blade 422. The propeller 420 is at the bottom end and the spin disc 422 is mounted adjacent to the upper end just above the liquid level line 424.

A conduit 426 leads to a vacuum pump, not shown.

Suitable resin syrup is introduced by a valved line 428, 430 from a supply tank 432.

First and second catalyst and/or accelerator and pigment are introduced by valved line 434, 436. Vessel 438 and valve 440 control first catalyst input; vessel 442 and valve 444 control second catalyst and/or accelerator input; and vessel 446 and valve 448 control pigment input.

The valve 434 serves as a master vacuum valve isolating the units 438–440, 442–444 and 446–448 from the conditions within the kettle 396.

After a suitable mixing and degas period in the kettle 396, the resin is run out through a bottom discharge line 450 that connects with valved line 452, 454 leading to the resin nozzles 250.

At this point, the resin is directed into the nip of rolls 30, 32 as described relative to FIGURE 1 and others.

The remainder of the resin system plumbing includes a valved emergency dump and clean-out line 456, 458. Once the catalyst is fully added and admixed with the raw resin, the pot life of the formulated system is relatively short. Therefore, should a production line malfunction develop, it will be necessary to dump the kettle contents before mass reaction sets in and reduces the pot contents to a non-flowable gel or mass. Should this happen, the whole system becomes fouled and the clean-up job is exasperating, time consuming and expensive to say the least. Accordingly, the emergency dump and clean-out is provided.

Also, a valved recirculation line 460, 462 and pump 463 are provided to return raw resin to the supply tank 432. Thus, if too much raw resin is run in for any reason, the excess can be recycled.

ACCELERATOR ADDITION TO SURFACING MAT

The application of accelerator to the reinforcement mat was described relative to the embodiments of FIGURES 22 and 23.

The extended scope of invention also includes accelerator application to the surfacing mats to provide even further improvements in uniformity of distribution through the resin.

Therefore, the lower portion of FIGURE 24 illustrates the manner of applying accelerator to one of the surfacing mats, the bottom surfacing mat only being illustrated. The top surface mat, of course, can be treated in the same manner.

A dip tank 464 is positioned in the path of travel of the lower surfacing mat 54. This dip tank 464 contains one or more dip rolls 466, 468. The mat 54 is run from a bulk roll 56 beneath rolls 466 and 468 and up between infrared heaters 470 to the nip rolls 30, 32.

This type of operation provides full integration and about the ultimate in the resin-catalyst mixture at the exact point of use for exact in situ accelerator combination with the resin.

It is to be understood that when accelerator is applied to the mat, it can be partly or completely omitted from the initial mixing system, as at the mixing and degas kettle 396.

The advantage of this operation is self-evident: thus the pot life of the resin remains indefinite where only inert pigment is admixed with the syrup for passage to the production line. In short, the pot is not changed from that of the raw syrup when inerts are added. Thus, no emergency dump should be required during production shut down or malfunction with the clean-out problems that ensue in case the mass reaction should take place in a kettle containing catalyzed resin.

THE METHOD OF THE INVENTION

In FIGURE 1(a) of the drawings, there is shown in schematic flow diagram form a recap of a principal part of the method for producing panels by this invention.

Actually, the process illustrated in FIGURE 1(a) breaks itself down further into a two-fold aspect as follows:

(1) The method of producing the wet lay-up at the nip roll; and (2) The method of continuously curing the wet lay-up by first bringing it to a gel stage or partial cure, and then subsequently molding after such partial or initial cure.

By reference to FIGURE 1(a), it will be noted that the various steps encompassing the foregoing aspects include those set out below.

It is to be understood, of course, that the steps listed follow input material formation including reinforcement mat production directly from virgin fiber or otherwise, and the optional addition of accelerator to the mat as a prelude to resin addition:

*Step I.*—Wet lay-up formation at the nip rolls;

*Step II.*—Running the wet lay-up through a radiation zone for humidity compensation of the cover film and conditioning of the other components;

*Step III.*—Pre-cure or gelling the wet resin lay-up by exposing it to a suitable temperature while sliding it across a flat gel plate prior to running it into the mold. The purpose of this step is to set or gel the resin and maintain uniform panel thickness at all areas during molding. Thus, proper gel control retards the resin against running from the high points of the mold to the low points; this prevents thin spots.

*Step III–a.*—Initial shape development prior to molding;

*Step IV.*—Molding and substantially curing the pregelled resin at suitable elevated temperature by pulling the gelled lay-up between upper and lower forming molds that act as a heat sink;

*Step V.*—Then moving the molded panel through an oven to provide full cure; and

*Step VI.*—Thereafter processing the panels by cutting and packaging for shipment.

In light of the foregoing brief perspective view of the method of invention, a more elaborate description of each stage and the co-ordination of the stages of the process will now be provided.

Thus, by reference to FIGURE 1, now note the various steps in proceeding through the following description.

STEP I.—WET RESIN LAY-UP FORMATION AT NIP ROLLS

By one apparatus or another, the reinforcement mats, surfacing mats and cover films are fed into a nip between two rolls in such manner as to provide tangential entry with good resin wet-out and degassing. An important aspect of the invention resides in the application of a mastic bead or ribbon along each edge of the lay-up to exclude air entry and prevent the liquid resin from running out of the cover films at the edges.

STEP II.—HUMIDITY COMPENSATION AND CONDITIONING

In as-received form, the cellophane cover sheets will have a variable humidity content. Therefore, in order to provide proper compensation and develop a controlled level of humidity for subsequent successful processing, the lay-up is radiated. This preshrinks the cover sheets to stable dimension. One way of doing this is to use a table and lamp according to FIGURE 1. This action is also helpful to precondition the resin for its entry into the following gel stage. Fiber wet-out is also assisted.

STEP III.—PRE-CURE OR GEL

As the wet lay-up enters the pre-cure or gel stage, it is gradually heated from room temperature, about 70°–90° F., on up to the gelling level of about 110° F. and up. Note that a heat sink assures proper control. Note further that initial cure is effected in the flat to provide uniform thickness throughout in later forming.

STEP III-A.—SHAPE DEVELOPMENT PRIOR TO MOLDING

As pointed out in the prior discussion, shape development can begin to take place at the out end of the gel plate, thus prior to entering the molds. This is effected by gravity and optional floating "sled" weight. The purpose is to gradually shape the resin without imparting wrinkles to the cover film.

STEP IV.—MOLDING OR POST-GEL FORMING

Next, the wet lay-up is gradually heated on up to a level not exceeding the boiling point of the monomer, about 214° F. Simultaneously, the mold pressures and forces are applied to shape and form the gel. The resin is now at full polymerization activity level, but still remains under precise control against exotherm "run-away." This is effected by providing a heat sink all around the lay-up.

Thus, Step 4 reduces the resin to a hard stage and thus the thickness and shape of the panel are fixed.

STEP V.—POST CURE

The cured panels from Step IV are next post cured and fully polymerized by a soaking period at about 250° F. for approximately 3–20 minutes. The panels are thereby fully completed and are directed to Step VI, following.

STEP VI.—CUT, PACKAGE, ETC.

At Step VI, necessary cutting, shearing, stacking, packaging and shipment operations are effected to prepare the finished product for shipment to and use by the ultimate consumer.

EXTENDED SCOPE OF INVENTION

Process variables

The *temperatures* set forth in the foregoing description have been alluded to only in a general way. As a broad statement, stage II and III temperatures of film conditioning and resin gelling will be in the range from about room temperature to about 185° F. Time and resin system will determine the specific temperature used, as all factors are correlated.

In general, the stage IV temperature will fall within the same range. In this stage, the upper limit will be the boiling point of the monomer. This is about 214° F. Of course, this level must not be reached or the product will be ruined. Thus, room temperature to about 185° F. is suggested to provide a safety factor. Again, time and resin system are all correlated with temperature or processing.

In the post cure oven, stage V, temperatures in the range from about 200° F. to about 300° F. can be utilized, with a range of about 265°–285° F. being preferred.

The *residence times* in the various stages of the process are in the range from about 5 to 30 minutes for a $\frac{1}{16}''$ thick lay-up, comprising about 60%–70% resin and about 40%–30% fiber content. Generally, it will be stated that residence time is "sufficient" to attain the goal or condition sought in the particular section under consideration. Thus, proper gel requires quite exact residence; and this may well vary according to conditions and resin characteristics. Also, the temperature will be understood to be variable within limits to achieve the particular goal of a particular section. These naturally flow hand-in-hand.

In light of the foregoing, it will also be understood that a sufficient residence time in the molds will be established to provide the goal of that section.

Thus, the foregoing comments are meant to bring out the fact that the line speed is subject to some careful variation to provide proper residence within the full scope of invention. Also, temperatures and residence are carefully co-ordinated.

FIBER AND RESIN CONTENTS

As briefly mentioned above when discussing residence time, it was stated that the products of invention can have resin content in the range of 60%–70%. More broadly this range can be extended to 20%–80% of the weight of the panel. When so operating, it will be evident that the fiber content values will be the supplements. Thus, the preferred fiber range is about 40%–30%; and the broad fiber range is about 80%–20%.

COVER FILMS

Regenerated cellulose or cellophane has been disclosed as the cover film for use in the foregoing embodiments of the invention. It has been found that the best grade obtainable is desirable. This is admittedly a cost factor, but because of the fact that it is the difference between commercial success and failure, the cost is fully justified.

The extended scope of invention, however, would include the use of other cover films. Actually, stainless steel foil or the like could be conceivably used and stripped from the product at the exit end of the forming molds for recovery and recirculation through the system. In 1000 ft. lengths, this would be entirely feasible. Also, acrylic cover films, silicone containing films and the like, could be used, so long as they were strippable from the cured resin and provided operability in accordance with the method set forth herein. Polyesters and polyolefins may be used also.

Three acrylic resin systems have been specifically mentioned in the foregoing description. However, although specific systems have been set forth, it is evident that these are subject to modification. Thus, the accelerator can be either partially or entirely added to the mix and degas kettle, or partially or entirely to the various mats that go into the wet lay-up.

It is also believed that the present invention is applicable to other heat polymerizable resins adapted to the production of panels. However, this statement is made knowing full well that gel table temperatures, top and bottom mold temperatures and post-cure oven temperatures, as well as line speeds and other factors will have to be adjusted to accommodate such other resin systems.

It is, of course, submitted that there is sufficient versatility to the procedural method of the present invention to encompass the operating techniques that may be essential in processing other polymerizable resins than the various acrylics.

It is thus evident that the present invention is applicable to the use of other resins, at least those of flowable liquid formulation, in the production of panels on a continuous basis. The polyesters of the prior art, of course, come readily to mind. However, in view of the disadvantages inherent in these prior polyester products as discussed above, the likelihood of further production of those elements without some advance in technology as an aftermath of the impact of the acrylic panels of the present invention on the commercial market is highly unlikely. The invention in its many ramifications and great versatility is nevertheless to be understood to cover such a contingency.

TOP MOLD MODIFICATION

Although the top mold has been described above as having the bottom formed as an actual mold surface, the broad scope of invention is in this instance extensible. Thus, the bottom of the top mold tank can be formed as a flat sheet the same as the top of the bottom mold. To this there can be detachably connected a mold sheet in the manner in which this was done in FIGURE 4 relative to bottom mold 126. Thus the broad scope of invention encompasses readily replaceable upper and lower molds for ease of shape change and of course minimum loss of product and materials because of short down time for change over.

Note that aluminum has been elected for the mold surfaces because of its high heat transfer. Within the broad scope of the invention, however, this surface might be made of Teflon or other high temperature resistant resin. Also, within the broad scope of invention, a coating of Teflon or high melting wax or the like can be applied to the mold surfaces to provide greater lubricity for passage of the laminate. Actually, a Teflon coated, galvanized iron sheet might be used in some instances.

It is also within the extended scope of invention to make the lower mold surface flexible. In this sense, the lower mold surface might be part of a pressure tank and pressurized fluid used to press the bottom mold uniformly into contact with the laminate. Also, the top tank could be similarly pressurized for accurate control and exact conformity to or with the bottom mold.

EXTENSION OF NIP CONSTRUCTION

The nip disclosed in the foregoing specification has been described as being formed by two corotatable cylindrical rolls or equivalent structures. However it is believed that the invention can be logically extended to include two fixed cylindrical surfaces positioned similarly to the roll surfaces.

By so operating, such surfaces would be coated with a suitable lubricant to allow passage of the cover film by sliding movement. This would permit the cover film to carry the mats in unstressed condition in the manner described relative to the operation of FIGURES 1, 14 and others.

Mats made from continuous fibers have been discussed generally. However, the extended scope would include chopped strand mats. Also, the extended scope would include non-reinforcement type materials, including glass flakes, fillers, other fibrous materials, etc. Thus, the invention is not limited to structural-type panels requiring reinforcement; it is also applicable to decorative panels using color and filler only.

In broader aspect, therefore, the invention relates not only to panel formation but also to a novel apparatus and method of handling acrylic resin systems.

ADVANTAGES AND CONTRIBUTIONS TO THE ART

In view of the foregoing, it will be obvious that a novel product, continuous production line and operating technique are contributed to the art by the present invention. These are characterized by the following features:

(1) Unique wet lay-up formation on a continuous basis, utilizing vertical nips and edge sealing by a mastic ribbon. See the left side of FIGURE 1 of the drawings. Improved mat wet-out and degassing are provided and with negligible fiber wash and mat distortion.

(2) Continuous curing by movement through fixed molds for the production of acrylic resin products of improved durability. Therefore, better products of reduced cost are provided for the consuming public.

(3) The present system is characterized by fixed supports in the form of:

(a) Fixed run-out table;
(b) Fixed gel plate; and
(c) Fixed forming molds.

(4) Totally integrated raw fiber to final panel formation. A truly "creation-to-consumer" concept. The benefits to both manufacturer and consumer are indeed substantial, to-wit:

(a) Complete elimination of interim handling of components between fiber formation and actual panel completion. This increases the manufacturer's profit by eliminating interim handling, labor costs and simultaneously enables him to reduce the cost to the consumer.
(b) A better quality controlled final product.

(5) Greatest flexibility of resin application both as regards:

(a) The resin system;
(b) Resin application.

Component (a) is characterized by accelerator addition either to the resin at the mixing and degassing stage or to the reinforcement and surface mats. Addition of accelerator to the mats, providing precise accelerator-resin mixing at the exact point of use, has been described above. This provides extended pot life to the raw resin syrup, cutting down the necessity for operator diligence and obviating emergency dumping with waste of resin and other problems inherent therein.

In view of all of these ramifications, the versatility of the resin system is truly demonstrated.

(6) Another important advantage is that of improved uniformity of cross section throughout the finished product. The gel production in the flat reduces run during later shaping. In a process where the wet resin is placed on a curing mold, runs are bound to result.

We claim:

1. In a method of forming a synthetic resin panel from a polymerizable, liquid, thermosetting resin and a fibrous reinforcement mat sandwiched between pliable cover films,
    the steps of
    forming a generally V-shaped pool of liquid resin between opposed, converging supports forming sides of the pool,
    moving a carrier film supported fibrous mat linearly in against one side of said pool to saturate the mat with the resin and wet out the fibers and degas the mat,
    moving a second carrier film linearly into said pool along a line spaced from the mat entrance,
    contactingly engaging said second carrier film and said mat within a narrower portion of said pool,
    moving the films and mat out through the narrowest part of the pool as a lay-up, and
    heating the lay-up for a sufficient period to polymerize the resin.

2. In a method of forming a synthetic resin panel from a polymerizable, liquid, thermosetting resin and a fibrous reinforcement mat,
    the steps of
    forming a generally V-shaped pool of liquid resin between opposed, converging arcuate supports forming arcuate sides of the pool,
moving a carrier film supported fibrous mat linearly through an arcuate path and into said pool against one side of said pool to saturate the mat with the resin and wet out the fibers and degas the mat,
moving a second carrier film linearly through an arcuate path and into said pool along the other side,
moving said second film into contact with said mat at about the bottom of said pool,
moving the films and mat out through the narrowest part of said pool as the lay-up, and
heating the lay-up for a sufficient period to polymerize the resin.

3. In a method of forming a synthetic resin panel from a polymerizable, liquid, thermosetting resin and a fibrous reinforcement mat,
the steps of
forming a generally V-shaped pool of liquid resin between opposed, converging supports forming sides of the pool, with the narrowest part of the pool at the bottom,
moving a carrier film supported fibrous mat linearly through a vertical arc into said pool against one side of said pool and at a first point,
moving a second carrier film linearly through a vertical arc into said pool along the other side at a second point substantially of the same elevation as said first point,
moving said second film into contact with said mat at a point below said first and second points,
moving the films and mat downwardly and out of said pool at said narrowest part as a lay-up, and
heating the lay-up for sufficient time to polymerize the resin.

4. In a method of forming a synthetic resin panel,
the steps of
forming a generally V-shaped pool of liquid thermosetting resin between opposed, converging supports forming sides of the pool with the narrowest part of the pool at the bottom,
moving a carrier film supported fibrous surface mat and a fibrous reinforcement mat linearly through a vertical arc into said pool against one side and at a first horizontal entry line,
said surface mat being positioned between the carrier film and reinforcement mat,
moving a second carrier film supported fibrous surface mat through a vertical arc into said pool against the other side at a second horizontal entry line and spaced from said first line at substantially the same elevation as said first line,
moving said second surface mat into contact with said reinforcement mat at a point below said first and second lines,
moving the films and mat vertically down out of said pool at the narrowest point as a lay-up, and
heating the lay-up for a sufficient period to polymerize the resin.

5. In a method of forming a synthetic resin panel,
the steps of
forming a generally V-shaped pool of liquid thermosetting resin between opposed, converging supports forming sides of the pool, with the narrowest part at the bottom,
flowing liquid resin as two non-turbulent layers into said pool at spaced points across the length of the pool,
moving a carrier film-supported fibrous mat linearly through a vertical arc into said pool against one side to wet and degas the mat at a first horizontal line,
moving a second carrier film linearly through a vertical arc into said pool along the other side at a second horizontal line,
moving said second film into contact with said mat along a line beneath said first and second lines within the pool,
moving said films and mat with saturating resin down and out of said pool as a lay-up, and heating the lay-up for a sufficient period to polymerize the resin by intimately contacting the lay-up with a body of heated liquid, which is effective to withdraw excess exothermic heat of polymerization from the resin and prevent monomer boil.

6. In a method of forming a synthetic resin panel from a polymerizable thermosetting liquid resin and a fibrous reinforcement mat, the resin having a monomer component, and being characterized by a polymerization exotherm sufficient to boil the monomer component,
the steps of
forming a generally V-shaped pool of liquid resin between opposed, converging supports forming sides of the pool,
moving a carrier film supported fibrous mat linearly in against one side of said pool to saturate the mat with the resin and degas the mat,
moving a second carrier film linearly into said pool along a line spaced from the mat entrance, and into engagement with said mat within a narrower portion of said pool,
moving the films and mat out through the narrowest part of the pool as a lay-up,
heating the lay-up to a temperature sufficient to initiate polymerization of the resin,
then maintaining polymerization temperature for a sufficient period to set the resin by intimately contacting the lay-up with a layer of heated liquid and withdrawing excess exothermic heat of polymerization from the resin back into said liquid to control rate of polymerization to prevent monomer boil,
and simultaneously with said polymerization, molding the lay-up to a selected cross sectional configuration.

7. In a method of forming a synthetic resin panel containing fibrous reinforcement, from a liquid resin having a monomer component, and a polymerization exotherm sufficient to boil the monomer component,
the steps of
forming a reinforcement mat from a strand made up of a plurality of continuous fibers,
forming a generally V-shaped pool of liquid resin between opposed, converging supports forming sides of the pool,
moving the mat, supported on a carrier film support, linearly in against one side of said pool to saturate the mat with the resin and degas the mat,
moving a second carrier film linearly into said pool along a line spaced from the mat entrance, and into engagement with said mat within a narrower portion of said pool,
moving the films and mat out through the narrowest part of the pool as a lay-up,
heating the lay-up to a temperature sufficient to initiate polymerization of the resin,
then maintaining polymerization temperature for a sufficient period to set the resin by intimately contacting the lay-up with a layer of heated liquid and withdrawing excess exothermic heat of polymerization from the resin back into said liquid to control the rate of polymerization to prevent monomer boil.
simultaneously with said polymerization, molding the lay-up to a selected cross sectional configuration,
and then subjecting the molded material to further heat for a sufficient time to substantially completely polymerize residual monomer.

(References on following page)

References Cited by the Examiner

UNITED STATES PATENTS

| | | | |
|---|---|---|---|
| 565,336 | 8/1896 | Ehret | 156—550 |
| 1,763,653 | 6/1930 | Harvey et al. | 161—121 |
| 1,776,790 | 9/1930 | Harvey et al. | 161—166 |
| 2,101,107 | 12/1937 | Strain. | |
| 2,214,330 | 9/1940 | Henderson et al. | 220—10 |
| 2,445,677 | 7/1948 | Leguillon | 156—500 |
| 2,468,094 | 4/1949 | Marks | 260—885 |
| 2,591,044 | 4/1952 | Bomhardt et al. | 220—81 |
| 2,769,742 | 11/1956 | Helbing | 156—246 |
| 2,784,763 | 3/1957 | Shorts | 156—324 X |
| 2,836,221 | 5/1958 | Bove | 156—550 |
| 2,842,473 | 7/1958 | Oberly et al. | 156—246 |
| 3,050,109 | 8/1962 | Monaco | 156—324 X |
| 3,085,617 | 4/1963 | Sorg | 156—500 |
| 3,109,763 | 11/1963 | Finger. | |
| 3,163,689 | 12/1964 | Ives | 156—246 X |

EARL M. BERGERT, *Primary Examiner.*

MORRIS SUSSMAN, *Examiner.*